US010362321B2

(12) United States Patent
Ueno et al.

(10) Patent No.: US 10,362,321 B2
(45) Date of Patent: Jul. 23, 2019

(54) IMAGE DISTRIBUTION DEVICE, IMAGE DISTRIBUTION SYSTEM, AND IMAGE DISTRIBUTION METHOD

(71) Applicants: Kabushiki Kaisha Toshiba, Minato-ku (JP); Toshiba Infrastructure Systems & Solutions Corporation, Kawasaki-shi (JP)

(72) Inventors: Hideki Ueno, Urayasu (JP); Sunao Wada, Yokohama (JP); Mikio Hamada, Setagaya (JP); Junichi Nakamura, Kawasaki (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 127 days.

(21) Appl. No.: 15/683,011

(22) Filed: Aug. 22, 2017

(65) Prior Publication Data
US 2018/0063539 A1    Mar. 1, 2018

(30) Foreign Application Priority Data
Aug. 31, 2016    (JP) .................. 2016-169959

(51) Int. Cl.
*G06F 3/06* (2006.01)
*G08G 1/01* (2006.01)
(Continued)

(52) U.S. Cl.
CPC ......... *H04N 19/427* (2014.11); *G06F 3/0608* (2013.01); *G08G 1/0112* (2013.01); (Continued)

(58) Field of Classification Search
None
See application file for complete search history.

(56) References Cited

U.S. PATENT DOCUMENTS

| 6,708,220 B1* | 3/2004 | Olin .................. H03M 7/30 382/232 |
| 8,949,372 B2* | 2/2015 | Tamiya .................. H04N 19/12 709/217 |

(Continued)

FOREIGN PATENT DOCUMENTS

| CN | 107864176 | * | 3/2018 |
| JP | 2003-85690 A | | 3/2003 |

(Continued)

OTHER PUBLICATIONS

Palubinskas, Gintautas, Franz Kurz, and Peter Reinartz. "Detection of traffic congestion in optical remote sensing imagery." IGARSS 2008—2008 IEEE International Geoscience and Remote Sensing Symposium. vol. 2. IEEE, 2008. (Year: 2008).*

(Continued)

*Primary Examiner* — Andrae S Allison
(74) *Attorney, Agent, or Firm* — Oblon, McClelland, Maier & Neustadt, L.L.P.

(57) ABSTRACT

In general, according to one embodiment, an image distribution device of the embodiment includes a receiver, a compressor, a request acceptor, a determiner, and a distributor. The receiver receives data captured by an imaging device of an in-vehicle device mounted in a vehicle. The compressor compresses the captured data of after elapse of a certain time to generate compressed captured data. The request acceptor accepts a distribution request to specify a desired time from an information processing device. The determiner determines whether the desired time is a past time within a certain time from a present time. The distributor distributes, when the desired time is the past time within the certain time from a present time, the captured data to the information processing device, and distributes, when the desired time is a past time prior to the certain time, the compressed captured data to the information processing device.

13 Claims, 20 Drawing Sheets

(51) Int. Cl.
| | | |
|---|---|---|
| *H04N 5/38* | (2006.01) | |
| *H04N 5/44* | (2011.01) | |
| *H04N 7/01* | (2006.01) | |
| *H04N 5/445* | (2011.01) | |
| *G08G 1/0967* | (2006.01) | |
| *H04N 19/426* | (2014.01) | |

(52) U.S. Cl.
CPC ......... *G08G 1/0129* (2013.01); *G08G 1/0141* (2013.01); *G08G 1/096716* (2013.01); *G08G 1/096741* (2013.01); *G08G 1/096775* (2013.01); *H04N 5/38* (2013.01); *H04N 5/4403* (2013.01); *H04N 5/44504* (2013.01); *H04N 5/44591* (2013.01); *H04N 7/01* (2013.01)

(56) References Cited

U.S. PATENT DOCUMENTS

| | | | | |
|---|---|---|---|---|
| 2006/0132602 | A1 | 6/2006 | Muto et al. | |
| 2006/0271286 | A1* | 11/2006 | Rosenberg | ......... G01C 21/3647 701/431 |
| 2009/0208121 | A1* | 8/2009 | Fujinuki | ................ H04N 19/46 382/233 |
| 2014/0031121 | A1* | 1/2014 | Kern | ..................... A63F 13/355 463/33 |
| 2014/0133836 | A1* | 5/2014 | Burns | ................... G11B 27/10 386/278 |
| 2015/0121224 | A1* | 4/2015 | Krasnahill, Jr. | ... H04N 21/4147 715/720 |
| 2015/0355807 | A1* | 12/2015 | Oldsberg | .............. G06F 3/0486 715/723 |
| 2018/0046188 | A1* | 2/2018 | Hwang | .................. B64C 39/02 |

FOREIGN PATENT DOCUMENTS

| | | |
|---|---|---|
| JP | 2013-20523 | 1/2013 |
| JP | 2013-51534 A | 3/2013 |
| JP | 2018133055 * | 8/2018 |

OTHER PUBLICATIONS

"Change the color of the line in the GPS trace map by speed", retrieved from the internet URL: http://blog.usoinfo.info/article/179789062.html , Jan. 9, 2011, 1 page (with unedited computer generated English translation).

\* cited by examiner

FIG.6

| TIME | VEHICLE ID | POSITION INFORMATION |
|---|---|---|
| 2016/7/22 17:00:00 | A0001 | LATITUDE=N35.6328, LONGITUDE=E139.8803 |
| 2016/7/22 17:00:02 | A0001 | LATITUDE=N35.6327, LONGITUDE=E139.8803 |
| 2016/7/22 17:00:04 | A0001 | LATITUDE=N35.6326, LONGITUDE=E139.8802 |
| ⋮ | ⋮ | ⋮ |
| 2016/7/22 17:10:00 | A0001 | LATITUDE=N35.6327, LONGITUDE=E139.8803 |
| 2016/7/22 17:10:02 | A0001 | LATITUDE=N35.6327, LONGITUDE=E139.8804 |
| ⋮ | ⋮ | ⋮ |
| 2016/7/22 17:10:00 | B0001 | LATITUDE=N35.6329, LONGITUDE=E139.8803 |
| 2016/7/22 17:10:02 | B0001 | LATITUDE=N35.6328, LONGITUDE=E139.8803 |
| ⋮ | ⋮ | ⋮ |

FIG.7

| TIME | VEHICLE ID | FILE NAME OF CAPTURED DATA |
|---|---|---|
| 2016/7/22 17:00:00 | A0001 | XXX1 |
| 2016/7/22 17:00:02 | A0001 | XXX2 |
| 2016/7/22 17:00:04 | A0001 | XXX3 |
| ⋮ | ⋮ | ⋮ |

FIG.8

| TIME | VEHICLE ID | FILE NAME OF COMPRESSED CAPTURED DATA |
|---|---|---|
| 2016/7/22 17:00:00 | A0001 | CXXX1 |
| 2016/7/22 17:03:00 | A0001 | CXXX2 |
| 2016/7/22 17:06:00 | A0001 | CXXX3 |
| ⋮ | ⋮ | ⋮ |

FIG.9

| USER ID | BELONGING |
|---|---|
| USERA01 | A COMPANY |
| USERB01 | B COMPANY |
| USERC01 | C COMPANY |
| USERD01 | D COMPANY |
| ⋮ | ⋮ |

| VEHICLE ID | OPEN RANGE |
|---|---|
| A0001 | OPEN TO A COMPANY USERS ONLY |
| B0001 | OPEN TO ALL USERS |
| C0001 | OPEN TO A COMPANY AND C COMPANY USERS ONLY |
| D0001 | OPEN TO ALL USERS |
| ⋮ | ⋮ |

908

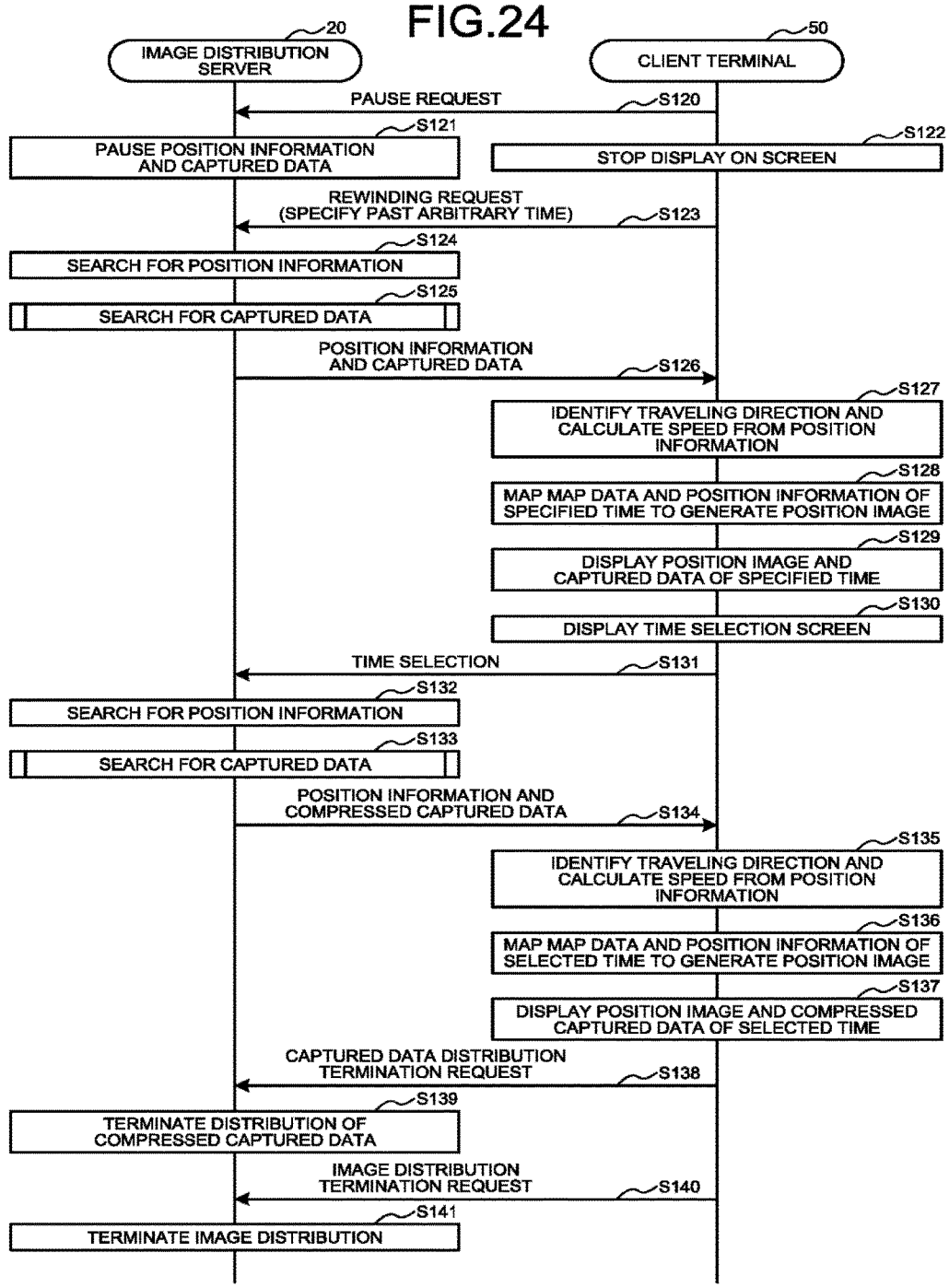

IMAGE DISTRIBUTION DEVICE, IMAGE DISTRIBUTION SYSTEM, AND IMAGE DISTRIBUTION METHOD

CROSS-REFERENCE TO RELATED APPLICATIONS

This application is based upon and claims the benefit of priority from Japanese Patent Application No. 2016-169959, filed Aug. 31, 2016, the entire contents of which are incorporated herein by reference.

FIELD

Embodiments described herein relate generally to an image distribution device, an image distribution system, and an image distribution method.

BACKGROUND

Conventionally, there has been known technologies to cause an imaging device of an in-vehicle device mounted in a vehicle to store captured data of an area where a traffic jam occurs and position information of the occurring area of the traffic jam, which is detected from the position of the in-vehicle device, and to provide a user with a state at the time of occurrence of the traffic jam.

By the way, to provide not only a state of a present time but also a state of a past time requested by the user, a large amount of past captured data needs to be stored without setting conditions such as occurrence of a specific event and the like. Therefore, to avoid an increase in a storage capacity of an image distribution device that distributes captured data, the image distribution device needs to compress and store the captured data. However, in this case, the image distribution device requires a time for expansion because the image distribution device expands and converts the compressed captured data into the captured data before compression. Therefore, when the image distribution device compresses the captured data to reduce the storage capacity, it has been difficult for the image distribution device to distribute the captured data in real time to allow the user to grasp the state in real time.

BRIEF DESCRIPTION OF THE DRAWINGS

FIG. 6 is a diagram illustrating an example of a table configuration of a position information database in the first embodiment;

FIG. 7 is a diagram illustrating an example of a table configuration of an attribute database in the first embodiment;

FIG. 8 is a diagram illustrating an example of a table configuration of a compressed data attribute database in the first embodiment;

FIG. 9 is a diagram illustrating an example of a table configuration of an authentication database in the first embodiment;

FIG. 10 is a diagram illustrating an example of a table configuration of an open range database in the first embodiment;

FIG. 24 is a sequence diagram illustrating an example of a flow of various types of request processing in the second embodiment.

DETAILED DESCRIPTION

In general, according to one embodiment, an image distribution device in the embodiment includes a receiver, a compressor, a request acceptor, a determiner, and a distributor. The receiver receives data captured by an imaging device of an in-vehicle device mounted in a vehicle. The compressor compresses the captured data of after elapse of a certain time from capturing by the imaging device to generate compressed captured data. The request acceptor accepts a distribution request to specify a desired time from an information processing device. The determiner determines whether the desired time is a past time within a certain time from a present time. The distributor distributes, when the desired time is the past time within the certain time from a present time, the captured data to the information processing device, and distributes, when the desired time is a past time prior to the certain time, the compressed captured data to the information processing device.

First Embodiment

Figure 1:
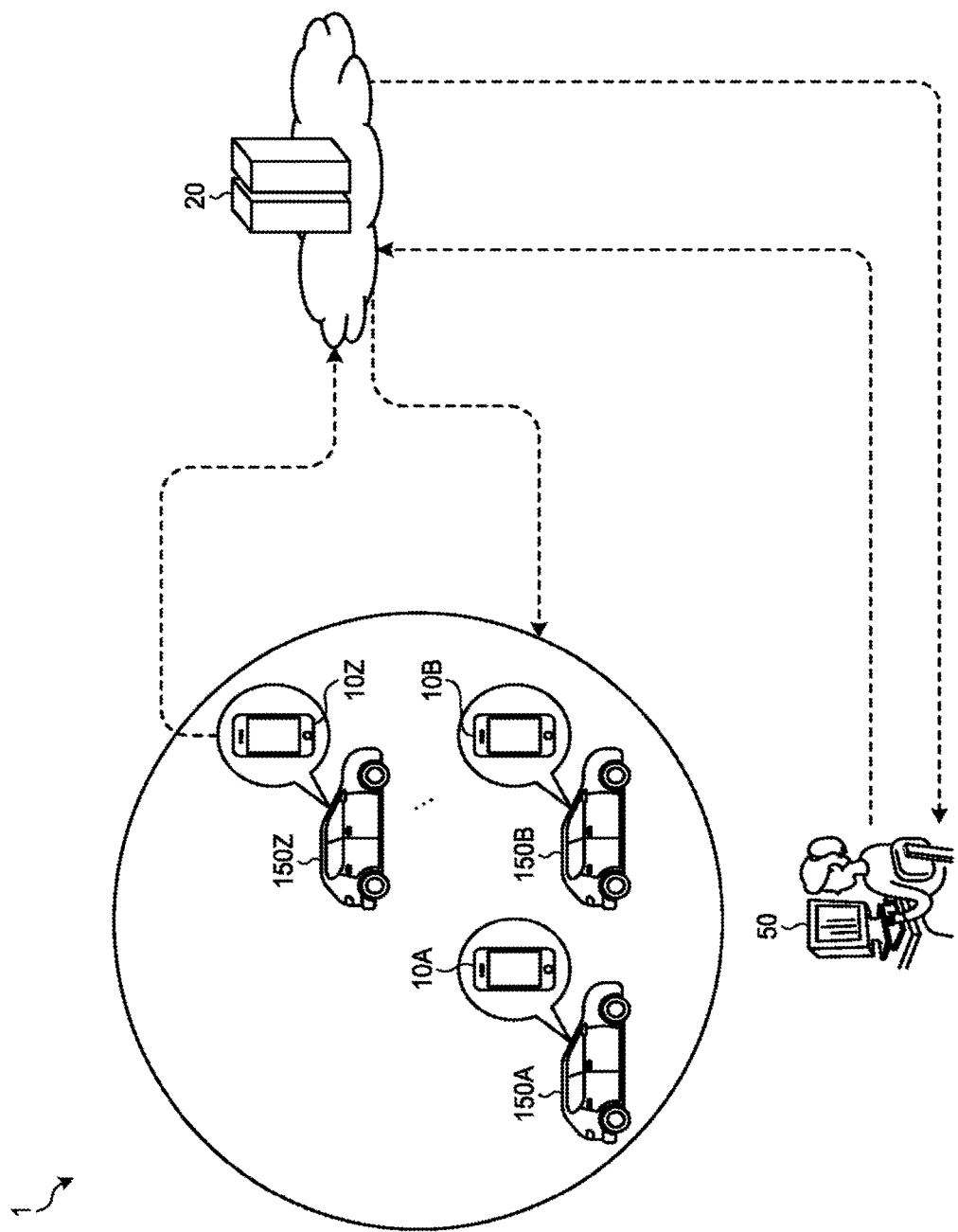
FIG. 1 is a diagram illustrating an example of an entire configuration of an image distribution system according to a first embodiment.

FIG. 1 is a diagram illustrating an example of an entire configuration of an image distribution system 1 according to the present embodiment. As illustrated in FIG. 1, the image distribution system 1 in the present embodiment includes in-vehicle devices 10A to 10Z, an image distribution server 20, and a client terminal 50. The in-vehicle devices 10A to 10Z, the image distribution server 20, and the client terminal 50 are connected through a network such as the Internet.

The in-vehicle devices 10A to 10Z are devices such as smart phones, tablet terminals, or drive recorders. As illustrated in FIG. 1, the in-vehicle devices 10A to 10Z are respectively mounted in vehicles 150A to 150Z. The in-vehicle devices 10A to 10Z are referred to as in-vehicle device 10 when they are collectively called. Further, the vehicles 150A to 150Z are referred to as vehicle 150 when they are collectively called.

The in-vehicle device 10 includes at least an imaging device such as a camera and a position information acquisition device that can acquire position information such as a GPS signal. The imaging device of the in-vehicle device 10 captures surroundings of the vehicle 150. The position information acquisition device acquires the position information of the in-vehicle device 10. The in-vehicle device 10 transmits captured data, the position information, and time information to the image distribution server 20.

Here, the position information is position coordinates of a present position of the in-vehicle device 10. For example, the position information indicates the position of the in-vehicle device 10 with latitude and longitude.

The image distribution server 20 receives the captured data, the position information, and the time information from the in-vehicle device 10. The image distribution server 20 is an example of an image distribution device in the present embodiment.

The image distribution server 20 converts the received captured data into a streaming distributable format. Further, the image distribution server 20 compresses the captured data after conversion, which is of after elapse of a certain time from capturing, to generate compressed captured data.

The image distribution server 20 accepts a request from the client terminal 50, and distributes the captured data after conversion or the compressed captured data, and an image including a position image generated from the position information, to the client terminal 50.

Here, the position image refers to an image of an icon being displayed on map data, the icon that indicates the position of the in-vehicle device 10 of a certain time.

The client terminal 50 is a computer that receives distribution of an image from the image distribution server 20. The client terminal 50 may be a typical personal computer (PC) or may be a smart phone, a tablet terminal, or the like. The client terminal 50 is an example of an information processing device in the present embodiment.

Next, details of the in-vehicle device 10 will be described.

Figure 2:
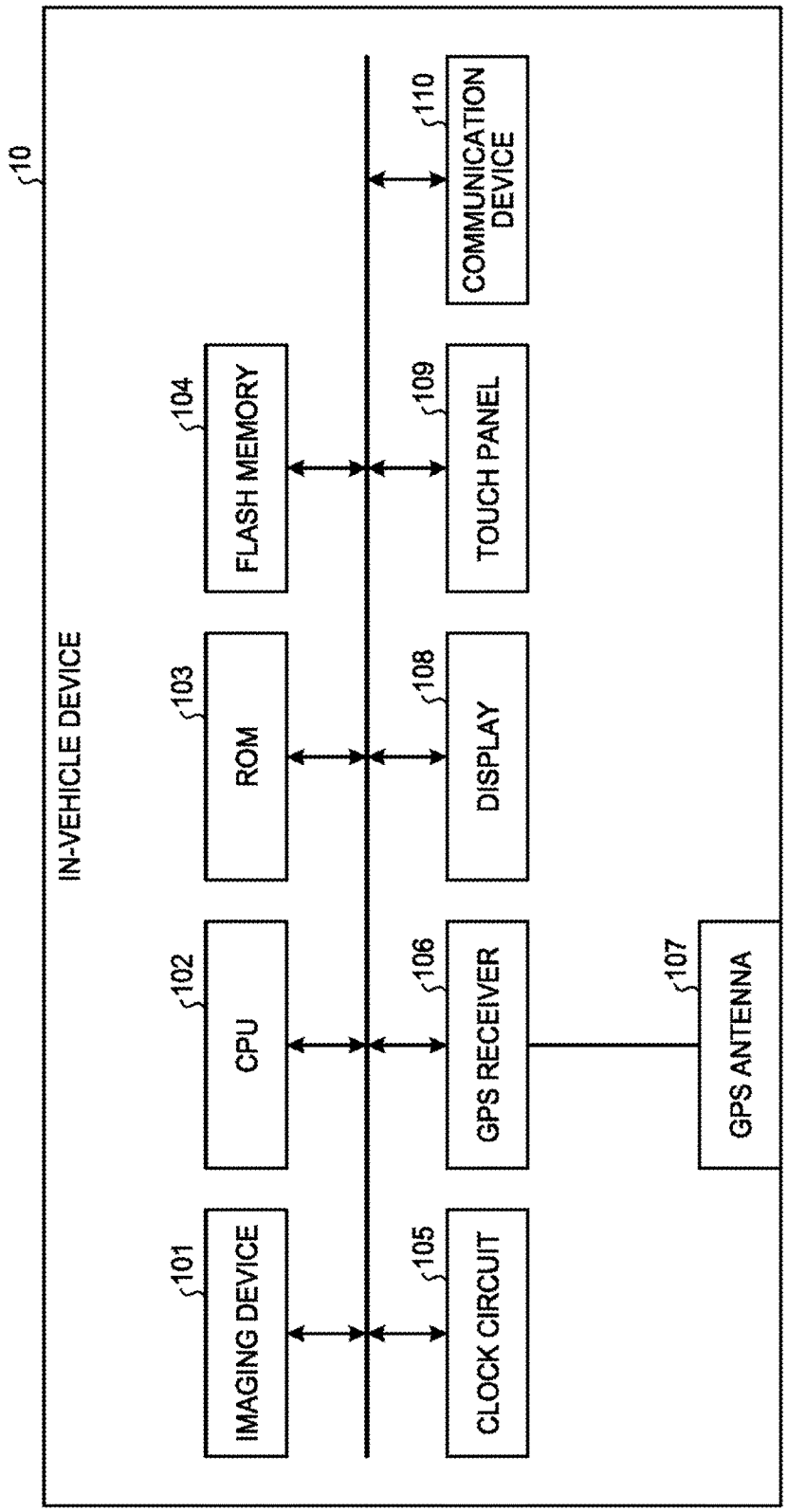
FIG. 2 is a diagram illustrating an example of a hardware configuration of an in-vehicle device in the first embodiment.

FIG. 2 is a diagram illustrating an example of a hardware configuration of the in-vehicle device 10 in the present embodiment. As illustrated in FIG. 2, the in-vehicle device 10 includes an imaging device 101, a CPU 102, a read only memory (ROM) 103, a flash memory 104, a clock circuit 105, a GPS receiver 106, a GPS antenna 107, a display 108, a touch panel 109, and a communication device 110.

The imaging device 101 is a camera that captures a moving image or a still image.

The CPU 102 is a control device that performs overall control of the in-vehicle device 10. For example, the CPU 102 executes a program and the like stored in the ROM 103 to realize various configurations.

The ROM 103 is a memory that stores readable data. The ROM 103 stores a program and the like.

The clock circuit 105 is a circuit having a clock function. Further, the in-vehicle device 10 may employ a configuration to acquire time information from an outside through a network or the like, in place of the clock circuit 105.

The GPS antenna 107 is an antenna that can receive a GPS signal.

The GPS receiver 106 receives signals from several satellites in the sky through the GPS antenna 107 to recognize (acquire) the present position of the in-vehicle device 10.

The flash memory 104 is a storage medium that stores the data captured by the imaging device 101, and data such as the position information recognized by the GPS receiver 106. Note that a storage medium such as a hard disk drive (HDD) may be provided in place of the flash memory 104.

The display 108 is a display device including a liquid crystal panel and the like. The display 108 displays an operation screen of the in-vehicle device 10 and the like.

The touch panel 109 is an input device integrally formed on the display 108, and which accepts an input of a user. A configuration to accept an operation of the user with a physical keyboard or the like may be employed in place of the touch panel 109.

The communication device 110 is an interface for the in-vehicle device 10 transmitting/receiving data and signals to/from the image distribution server 20.

Next, a functional configuration of the in-vehicle device 10 will be described.

Figure 3:
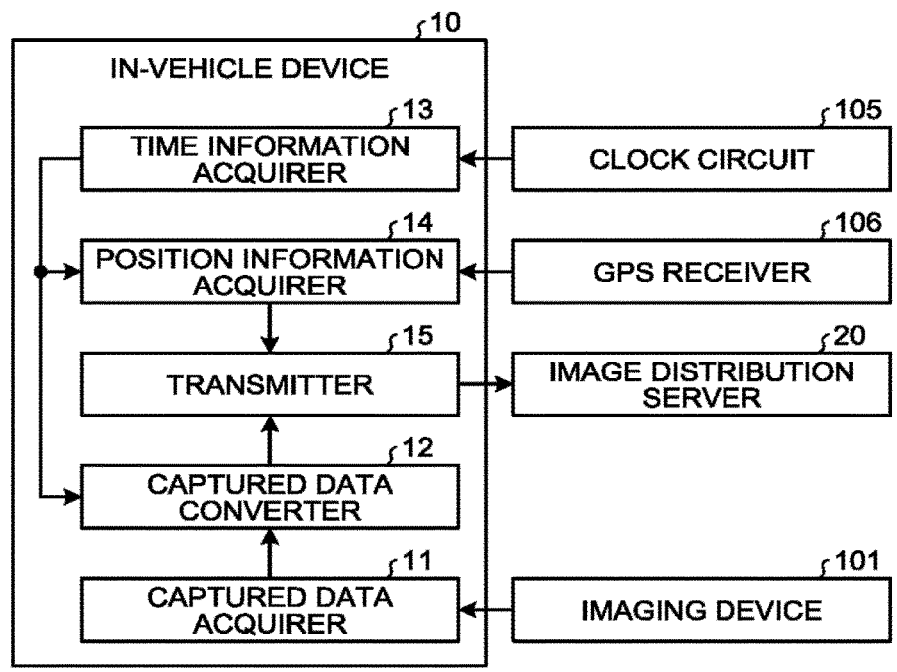
FIG. 3 is a block diagram illustrating an example of a functional configuration of the in-vehicle device in the first embodiment.

FIG. 3 is a block diagram illustrating an example of a functional configuration of the in-vehicle device 10 in the present embodiment. As illustrated in FIG. 3, the in-vehicle device 10 includes a captured data acquirer 11, a captured data converter 12, a time information acquirer 13, a position information acquirer 14, and a transmitter 15.

The captured data acquirer 11 acquires the data captured by the imaging device 101. In the present embodiment, the captured data is a moving image. The captured data acquirer 11 sends the acquired captured data to the captured data converter 12.

The time information acquirer 13 acquires time information that is a time of when the imaging device 101 has captured the data, from the clock circuit 105. The time information acquirer 13 sends the acquired time information to the captured data converter 12 and the position information acquirer 14.

The captured data converter 12 associates the time information with the captured data. Further, the captured data converter 12 converts the format of the captured data in order to efficiently transmit the captured data to the image distribution server 20. The conversion referred to here is to compress the captured data, for example. As a compression method, H.264 method may be employed, for example. The captured data converter 12 sends the captured data converted for transmission and the time information to the transmitter 15 in association with each other.

The position information acquirer 14 acquires the position information from the GPS receiver 106. The position information acquirer 14 continuously acquires the position information every fixed time, from when the imaging device 101 starts capturing to when the imaging device 101 terminates the capturing. The fixed time is two seconds, for example, in the present embodiment. The position information acquirer 14 associates the time information with the position information. The position information acquirer 14 sends the position information and the time information to the transmitter 15 in association with each other.

The transmitter 15 transmits the captured data converted for transmission, which has been acquired from the captured data converter 12, and the time information to the image distribution server 20 in association with each other. As a protocol used for transmission of the captured data converted for transmission, a real time messaging protocol (RTMP) may be employed, for example. Further, the transmitter 15 transmits the position information acquired from the position information acquirer 14 and the time information to the image distribution server 20 in association with each other.

Next, details of the image distribution server 20 will be described.

Figure 4:
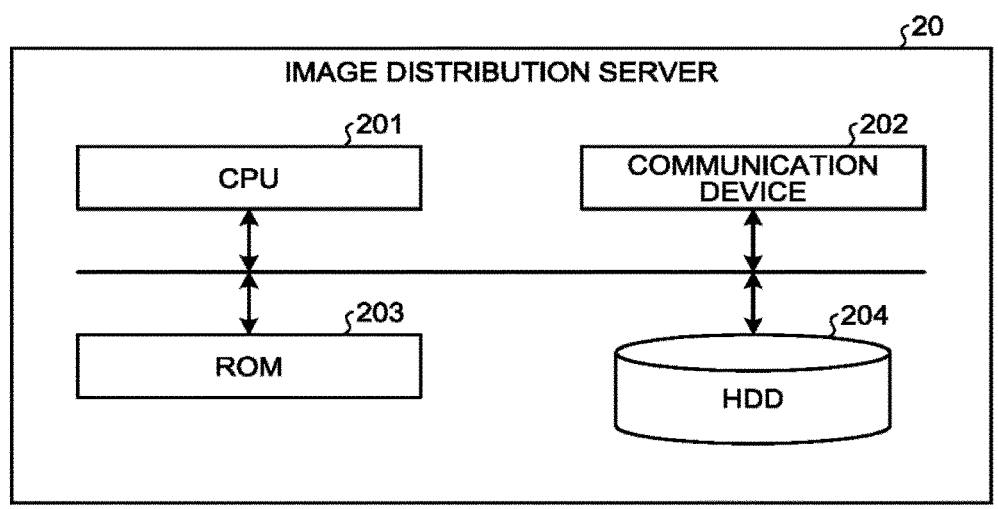
FIG. 4 is a diagram illustrating an example of a hardware configuration of an image distribution server in the first embodiment.

FIG. 4 is a diagram illustrating an example of a hardware configuration of the image distribution server 20 in the present embodiment. As illustrated in FIG. 4, the image distribution server 20 includes a CPU 201, a communication device 202, a ROM 203, and an HDD 204.

The CPU 201 is a control device that performs overall control of the image distribution server 20. For example, the CPU 201 executes a program and the like stored in the ROM 203 to realize various configurations.

The communication device 202 is an interface for the image distribution server 20 transmitting/receiving data and signals to/from the in-vehicle device 10 and the client terminal 50.

The ROM 203 is a memory that stores readable data. For example, the ROM 203 stores a program and the like.

The HDD 204 is a storage device that stores data acquired from the in-vehicle device 10, data after image processing, and the like.

Next, a functional configuration of the image distribution server 20 will be described.

Figure 5:
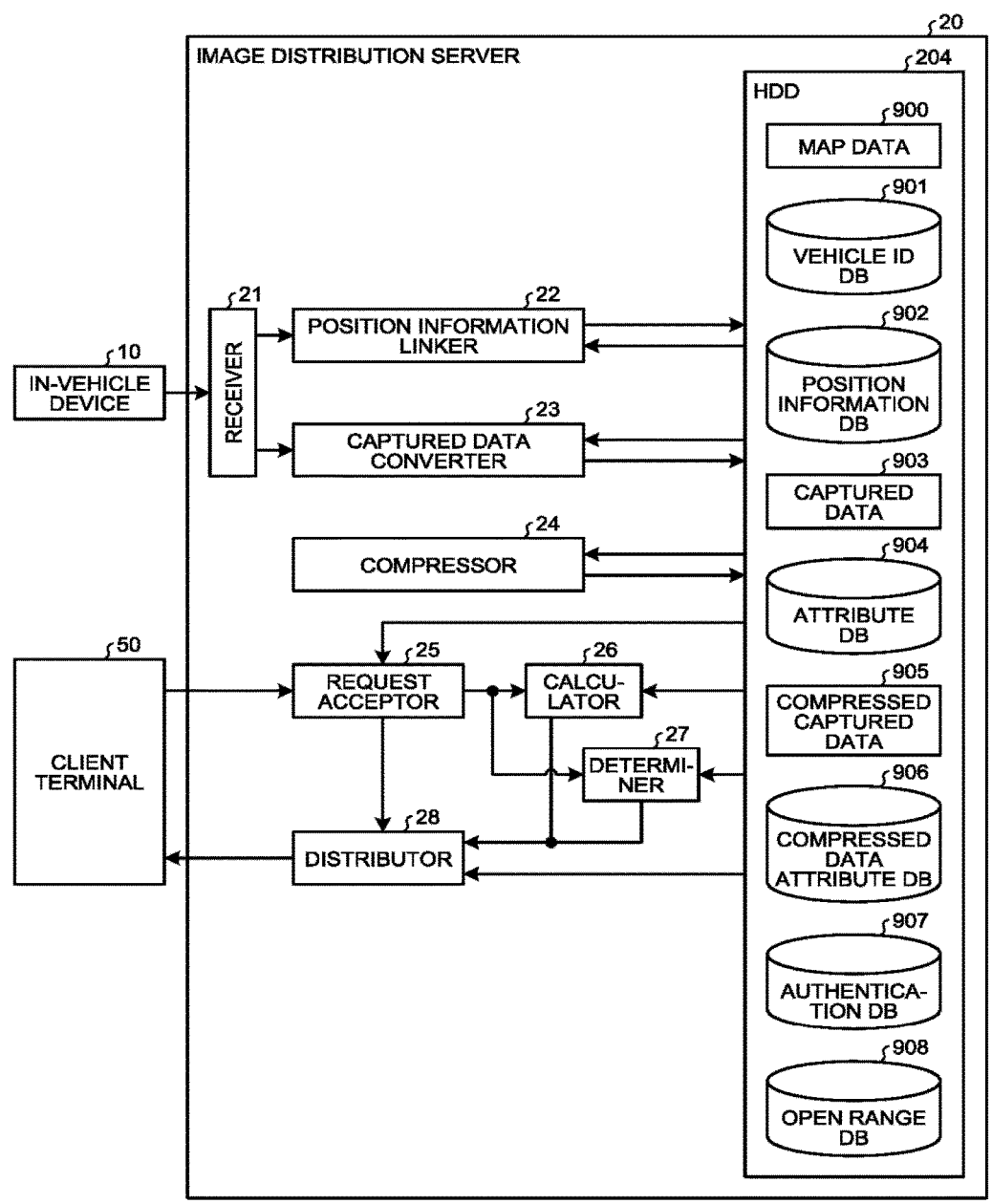
FIG. 5 is a block diagram illustrating an example of a functional configuration of the image distribution server in the first embodiment.

FIG. 5 is a block diagram illustrating an example of a functional configuration of the image distribution server 20 in the present embodiment. As illustrated in FIG. 5, the image distribution server 20 includes a receiver 21, a position information linker 22, a captured data converter 23, a compressor 24, a request acceptor 25, a calculator 26, a determiner 27, and a distributor 28.

Further, the HDD 204 stores map data 900, a vehicle ID database 901 (hereinafter, referred to as "vehicle ID DB 901"), a position information database 902 (hereinafter, referred to as "position information DB 902"), captured data 903, an attribute database 904 (hereinafter, referred to as "attribute DB 904"), compressed captured data 905, a compressed data attribute database 906 (hereinafter, referred to as "compressed data attribute DB 906"), an authentication database 907 (hereinafter, referred to as "authentication DB 907"), and an open range database 908 (hereinafter, referred to as "open range DB 908").

The vehicle ID DB 901 is a database that stores a vehicle ID as identification information for uniquely identifying the vehicle 150 having the in-vehicle device 10 mounted therein. The vehicle ID DB 901 stores the in-vehicle device 10, and the vehicle ID of the vehicle 150 having the in-vehicle device 10 mounted therein in association with each other.

The position information DB 902 is a database that stores the position information and the time information received from the in-vehicle device 10, and the vehicle ID of the vehicle 150 having the in-vehicle device 10 mounted therein in association with each other.

FIG. 6 is a diagram illustrating an example of a table configuration of the position information DB 902 in the present embodiment. As illustrated in FIG. 6, the position information DB 902 is a database that associates a time, the vehicle ID, and the position information.

The time is time information transmitted in association with the position information by the in-vehicle device 10, and indicates a time of when the position information acquirer 14 has acquired the position information.

The vehicle ID is identification information for identifying the vehicle 150 having the in-vehicle device 10 mounted therein as a transmission source of the position information.

The position information is the position information transmitted from the in-vehicle device 10.

The captured data 903 is captured data converted for streaming distribution by the captured data converter 23, the captured data having been converted for transmission to the image distribution server 20 and received from the in-vehicle device 10. As a format for streaming distribution, a format such as HTTP live streaming (HLS) may be employed, for example. Hereinafter, when the captured data 903 is simply referred, the captured data 903 converted for streaming distribution is referred.

The attribute DB 904 is a database that stores attribute information of the captured data 903. The attribute DB 904 stores time information associated with the captured data converted for transmission, which has been received from the in-vehicle device 10, and the vehicle ID for identifying the vehicle 150 having the in-vehicle device 10 mounted therein as an acquisition source of the captured data 903 and the time information.

FIG. 7 is a diagram illustrating an example of a table configuration of the attribute DB 904 in the present embodiment. As illustrated in FIG. 7, the attribute DB 904 is a database that associates a time, the vehicle ID, and a file name of the captured data.

The time is time information transmitted in association with the captured data converted for transmission by the in-vehicle device 10, and indicates the time of when the imaging device 101 has captured the data.

The vehicle ID is identification information for identifying the vehicle 150 having the in-vehicle device 10 mounted therein as a transmission source of the captured data converted for transmission.

The file name of the captured data is identification information for identifying the captured data 903 associated with the time and the vehicle ID. The identification information is not limited to the file name as long as the identification information identifies the captured data 903, and a configuration to register a control number, a pass of a storage destination of a file, or the like may be employed.

Referring back to FIG. 5, the compressed captured data 905 is data that is compressed captured data 903 by the compressor 24 described below, the captured data 903 being of after elapse of a certain time from capturing. As a file format to be used for compression, MP4 may be employed, for example.

The compressed data attribute DB 906 is a database that stores attribute information of the compressed captured data 905. For example, the compressed data attribute DB 906 stores time information associated with the compressed captured data 905, and the vehicle ID for identifying the vehicle 150 having the in-vehicle device 10 mounted therein as an acquisition source of the compressed captured data 905 and time information.

FIG. 8 is a diagram illustrating an example of a table configuration of the compressed data attribute DB 906 in the present embodiment. As illustrated in FIG. 8, the compressed data attribute DB 906 is a database that associates a time, the vehicle ID, and a file name of the compressed captured data.

The time is the time information transmitted in association with the captured data converted for transmission by the in-vehicle device 10, and indicates the time of when the imaging device 101 has captured the captured data. In a case where a plurality of the captured data 903 is compressed to one compressed captured data 905, an earliest time, of times associated with the compressed captured data 903, is employed.

The vehicle ID is the identification information for identifying the vehicle 150 having the in-vehicle device 10 mounted therein as a transmission source of the captured data converted for transmission.

The file name of the compressed captured data is identification information for identifying the compressed captured data 905 associated with the time and the vehicle ID. The identification information is not limited to the file name as long as the identification information identifies the compressed captured data 905, and a configuration to register a control number, a pass of a storage destination of a file, or the like may be employed.

Referring back to FIG. 5, the authentication DB 907 is a database that stores identification information of a user who can log in to the client terminal 50 and authority of the user in association with each other.

FIG. 9 is a diagram illustrating an example of a table configuration of the authentication DB 907 in the present embodiment. As illustrated in FIG. 9, the authentication DB 907 is a database that associates a user ID and belonging.

The user ID is identification information for uniquely identifying the user.

The belonging indicates an organization such as a company to which the user identified with the user ID belongs. For example, as illustrated in FIG. 9, a user with a user ID "USERA01" belongs to "A company". The belonging is an example of the authority of the user in the present embodiment. The authority is not limited to the belonging of the user, and a configuration to limit the authority of the user according to a charged amount or the like may be employed.

Referring back to FIG. 5, the open range DB 908 is a database that stores the vehicle ID, and an open range of the captured data and the position information of the in-vehicle device 10 mounted in the vehicle 150 with the vehicle ID in association with each other.

FIG. 10 is a diagram illustrating an example of a table configuration of the open range DB 908 in the present embodiment. As illustrated in FIG. 10, the open range DB 908 is a database that associates the vehicle ID and the open range.

The vehicle ID is identification information for identifying the vehicle 150 having the in-vehicle device 10 mounted therein as a transmission source of the captured data converted for transmission and the position information.

The open range is a range of users to which the captured data and the position information of the in-vehicle device 10 mounted in the vehicle 150 with the vehicle ID are open.

For example, as illustrated in FIG. 10, the open range of the captured data and the position information of the in-vehicle device 10 mounted in the vehicle 150 with a vehicle ID "A0001" is set to "open to A company users only". That is, in the authentication DB 907 described in FIG. 9, the user with the user ID "USERA01" registered with the belonging "A company" is an open target of the captured data 903, the compressed captured data 905, and the position information associated with the vehicle ID "A0001". However, a user with a user ID "USERB01" is registered with belonging "B company" in the authentication DB 907, and is thus not included in the open target of the captured data 903, the compressed captured data 905, and the position information associated with the vehicle ID "A0001".

Meanwhile, in the open range DB 908 illustrated in FIG. 10, the open range of the captured data and the position information of the in-vehicle device 10 mounted in the vehicle 150 with a vehicle ID "B0001" is set to "open to all users". Therefore, both the user with the user ID "USERA01" and the user with the user ID "USERB01" are the open targets of the captured data 903, the compressed captured data 905, and the position information associated with the vehicle ID "B0001".

Referring back to FIG. 5, the receiver 21 receives, from the in-vehicle device 10, the captured data converted for transmission to the image distribution server 20 and the time information associated with the captured data converted for transmission. The receiver 21 sends, to the captured data converter 23, the received captured data converted for transmission to the image distribution server 20, the time information associated with the captured data converted for transmission, and information that identifies the in-vehicle device 10 as a transmission source.

Further, the receiver 21 receives, from the in-vehicle device 10, the position information and the time information associated with the position information. The receiver 21 sends the received position information, the time information associated with the position information, and the information that identifies the in-vehicle device 10 as a transmission source to the position information linker 22. As the information that identifies the in-vehicle device 10 as a transmission source, a MAC address of the in-vehicle device 10 may be employed, for example.

The position information linker 22 receives, from the receiver 21, the position information, the time information associated with the position information, and the information that identifies the in-vehicle device 10 as a transmission source. The position information linker 22 acquires the vehicle ID of the vehicle 150 having the in-vehicle device 10 as a transmission source mounted therein from the vehicle ID DB 901. The position information linker 22 stores the position information, the time information associated with the position information, and the vehicle ID acquired from the vehicle ID DB 901 to the position information DB 902 in association with one another.

The captured data converter 23 receives, from the receiver 21, the captured data converted for transmission to the image distribution server 20, the time information associated with the captured data converted for transmission, and the information that identifies the in-vehicle device 10 as a transmission source. The captured data converter 23 converts the captured data converted for transmission to the image distribution server 20 into the captured data 903 in a format for streaming distribution, i.e., a format such as HLS. In a case where the captured data is converted into the HLS format, the captured data converted for transmission, which has been received by the receiver 21, is divided in units of every fixed time when converted into the captured data 903 for streaming distribution. The captured data converter 23 stores the captured data 903 to the HDD 204. The captured data converter 23 is an example of a converter in the present embodiment.

Further, the captured data converter 23 stores the attribute information of the captured data 903 to the attribute DB 904. To be specific, the captured data converter 23 acquires, from the vehicle ID DB 901, the vehicle ID of the vehicle 150 having the in-vehicle device 10 as a transmission source mounted therein. The captured data converter 23 stores the time information associated with the captured data converted for transmission, the vehicle ID acquired from the vehicle ID DB 901, and the file name of the captured data 903 converted into the format for streaming distribution to the attribute DB 904 in association with one another.

Further, the captured data converter 23 calculates a start time of each captured data 903 divided every fixed time, and stores the start time and the file name of each captured data 903 to an item "time" in the attribute DB 904 in association with each other.

In the present embodiment, the position information linker 22 and the captured data converter 23 employ the configuration to associate the vehicle ID with the position information or the captured data 903. However, a technique to associate the data is not limited thereto. For example, a configuration in which the in-vehicle device 10 associates the captured data converted for transmission and the position information with the vehicle ID in advance, and transmits the associated data to the image distribution server 20 may be employed.

Further, the captured data converter 23 performs image processing for the captured data 903 as needed. As an example of the image processing, the captured data converter 23 may detect a license plate of an captured vehicle from the captured data 903 and apply mosaic processing or the like so as not to enable identification of a number, for privacy protection.

Further, the captured data converter 23 may detect an captured person from the captured data 903 and apply mosaic processing or the like to a head so as not to enable identification of the individual, for privacy protection. Further, the captured data converter 23 may employ a configuration to separately store both the captured data 903 to which such image processing has been applied and the captured data 903 to which the image processing has not been applied, and to use the different captured data 903 depending on a user as a distribution target.

The compressor 24 compresses the captured data 903 after being converted into the format for streaming distribution, and of after elapse of a certain time from capturing by the imaging device 101 of the in-vehicle device 10, to a file format such as MP4 to generate the compressed captured data 905. In the present embodiment, the certain time is, but not limited to, three minutes, for example.

Further, the compressor 24 stores the attribute information of the compressed captured data 905 to the compressed data attribute DB 906. To be specific, the compressor 24 associates the time associated with the captured data 903 before compression, and the vehicle ID, with the file name of the compressed captured data 905 that is the compressed captured data 903, and stores the associated data to the compressed data attribute DB 906.

The compressor 24 deletes the captured data 903 of which compression has been completed, from the HDD 204. Further, the compressor 24 deletes record in the attribute DB 904, the record corresponding to the captured data 903 of which the compression has been completed.

The compression of the captured data 903 by the compressor 24 can prevent an increase in disk capacity of the HDD 204. Further, the compression of the captured data 903 by the compressor 24 can reduce a network load of when the distributor 28 described below distributes the compressed captured data 905 of a past time to the client terminal 50. The compression target of the compressor 24 being the captured data 903 of after elapse of a certain time, instead of all the captured data 903, is because of not impairing realtime properties in the distribution of the captured data 903 to the client terminal 50.

Further, at a past time close to the present, the user makes, with high possibility, a display request in processing such as rewinding. The compressed captured data 905 requires expansion processing for reproduction, and thus takes more time to be reproduced on a screen in distribution than the captured data 903. Therefore, the compressor 24 does not compress the captured data 903 until the certain time elapses from the present time.

In the present embodiment, the time of when the captured data 903 has been captured is employed as a reference for calculation of the certain time. However, the reference is not limited to the time. For example, the time of when the receiver 21 has received the converted captured data from the in-vehicle device 10, or the time of when the captured data converter 23 stores the captured data 903 to the HDD 204 may be employed as the reference for calculation of the certain time.

In the present embodiment, the configuration to store the captured data 903 and the compressed captured data 905 to the HDD 204 is employed. However, an embodiment is not limited thereto, and a configuration to store the data to a storage medium such as a writable memory may be employed. Further, as for the attribute information of the captured data 903 and the compressed captured data 905 stored in the attribute DB 904 and the compressed data attribute DB 906, the configuration to store the information to a storage medium such as a writable memory may be employed.

The request acceptor 25 accepts, from the client terminal 50, various requests from the user. To be specific, the request acceptor 25 accepts, from the client terminal 50, requests such as a position display request, a captured data display request, a pause request, a rewinding request, a fast-forwarding request, a display request of a time selection screen, selection of a display target time, a captured data distribution termination request, and an image distribution termination request, of the user.

The position display request is a request of distribution of the position image of a desired time of the user. The request acceptor 25 accepts, from the client terminal 50, the position display request, the user ID of the user who has logged in to the client terminal 50, and the desired time of the user. The request acceptor 25 searches the authentication DB 907 for the authority of the user with the user ID. The request acceptor 25 then searches the open range DB 908 for the vehicle ID including the user with the user ID in the open range. The request acceptor 25 sends the found vehicle ID and the desired time of the user to the calculator 26 and the distributor 28.

Further, the captured data display request is a request of distribution of the captured data 903 of a desired time of the user. The captured data display request is made with specification of a specific vehicle ID. When accepting the captured data display request from the client terminal 50, the request acceptor 25 sends the desired time of the user and the vehicle ID to the distributor 28. Further, the request acceptor 25 sends the desired time of the user to the determiner 27. The position display request and the captured data display request are examples of a distribution request in the present embodiment.

The pause request is a request of pausing the position image and the captured data 903 or the compressed captured data 905 in distribution, during distribution of an image. When accepting a click on a pause button on the screen by the user, the client terminal 50 transmits the pause request to the request acceptor 25. When accepting the pause request, the request acceptor 25 sends a pause instruction of the position image and the captured data 903 or the compressed captured data 905 in distribution to the distributor 28.

Figure 11:
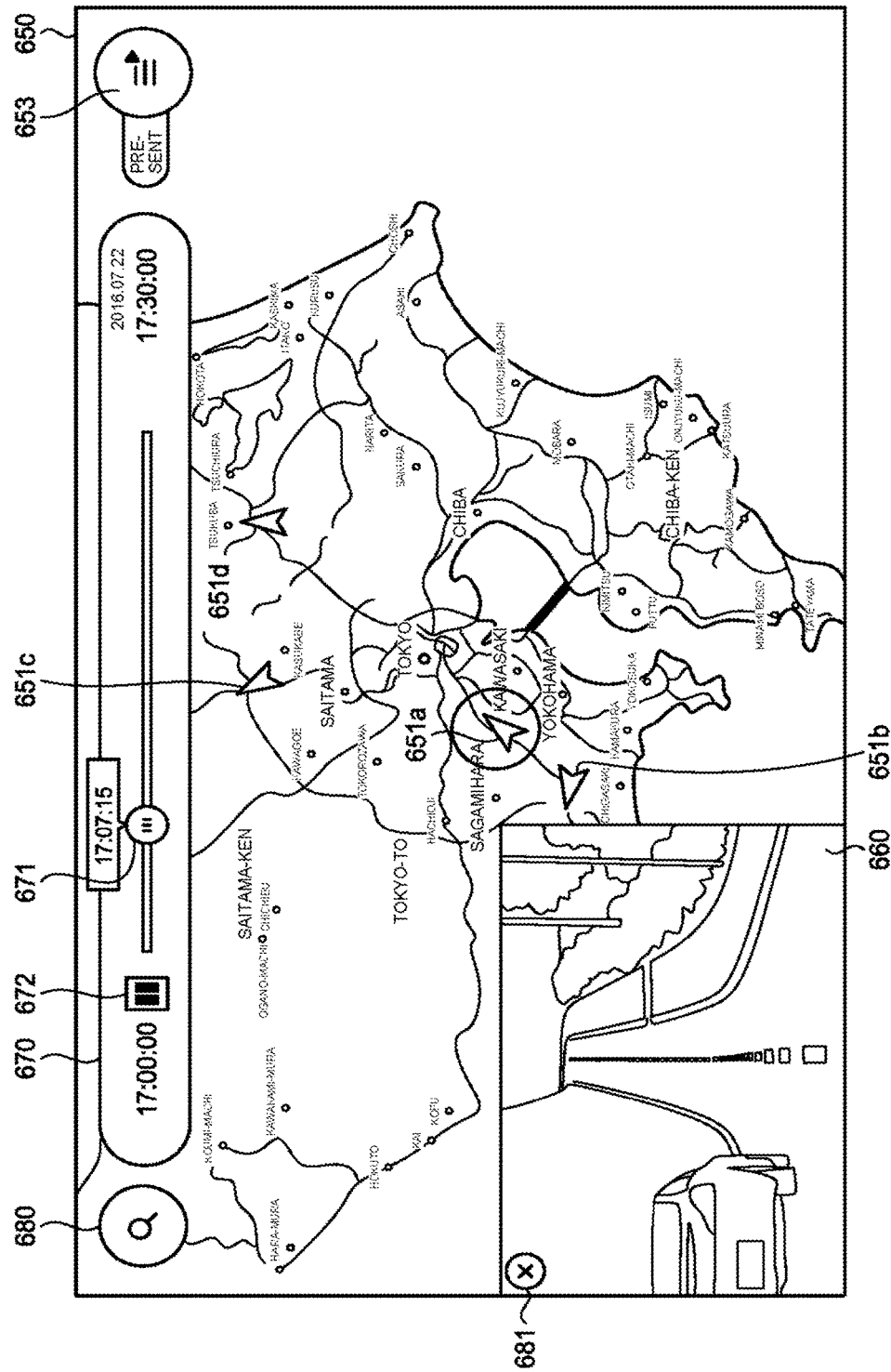
FIG. 11 is a diagram illustrating an example of a screen image of an image distributed by the image distribution server in the first embodiment.

FIG. 11 is a diagram illustrating an example of a screen image of an image distributed by the image distribution server 20 in the present embodiment. The image illustrated in FIG. 11 is distributed to the client terminal 50 by the distributor 28 described below and displayed on a web browser on a display of the client terminal 50. As illustrated in FIG. 11, the image distributed by the image distribution server 20 includes a position image reproduction area 650, a captured data reproduction area 660, a seek bar 670, a selection screen display button 653, and a search button 680. The captured data reproduction area 660 includes a close button 681.

Further, the seek bar 670 includes a pointer (control) 671 indicating a time position in reproduction, and a pause button 672. Alternatively, a configuration to display the pause button 672 separately from the seek bar 670 may be employed. As illustrated in FIG. 11, a configuration to display a date of the image in reproduction, a past time as a limit of rewinding of the image in reproduction, and the like on the seek bar 670 may be employed.

In the distributed image in the present embodiment, one captured data reproduction area 660 is arranged on one screen. Therefore, the captured data display request specifies one vehicle ID. However, a configuration to arrange a plurality of the captured data reproduction areas 660 on one screen to enable specification of a plurality of the vehicle IDs with the captured data display request may be employed.

The rewinding request is a request of distribution of the position image and the captured data 903 or the compressed captured data 905 of a past arbitrary time specified with an operation of the seek bar 670 on the screen by the user during distribution of an image.

Referring back to FIG. 5, when accepting the rewinding request from the client terminal 50, the request acceptor 25 sends the past arbitrary time specified by the user and the vehicle ID including the user in the open range to the calculator 26 and the distributor 28.

Further, when the rewinding request is made during distribution of the captured data 903 or the compressed captured data 905, the request acceptor 25 further sends the vehicle ID of the captured data 903 or the compressed captured data 905 in distribution to the distributor 28. Further, the request acceptor 25 sends the past arbitrary time specified by the user to the determiner 27.

The seek bar 670 illustrated in FIG. 11 is an image for operation for reproduction control of the position image and the captured data 903 or the compressed captured data 905. The seek bar 670 indicates the time of the position image and the captured data 903 or the compressed captured data 905 in reproduction by the position of the pointer 671 arranged on the seek bar 670. Further, the pointer 671 accepts an operation to specify the past arbitrary time from the user. The seek bar 670 is an example of operation information in the present embodiment.

Further, when the user operates the seek bar 670 on the screen to specify a time closer to the present time than to the past time in distribution, during distribution of a past position image and captured data 903 or compressed captured data 905, the fast-forwarding request is made.

Referring back to FIG. 5, when accepting the fast-forwarding request from the client terminal 50, the request acceptor 25 sends the time specified by the user and the vehicle ID including the user in the open range to the calculator 26. Further, when the fast-forwarding request is made during distribution of the captured data 903 or the compressed captured data 905, the request acceptor 25 sends the time specified by the user and the vehicle ID of the captured data 903 or the compressed captured data 905 in distribution to the distributor 28. Further, the request acceptor 25 sends the time specified by the user to the determiner 27.

The display request of a time selection screen is to operate the selection screen display button 653 on the image by the user to request display of the time selection screen on the screen, during distribution of the image.

The time selection screen is a screen on which selection of the past arbitrary time by the user is acceptable. While the seek bar 670 accepts a rewinding or fast-forwarding operation with an operation on the same screen, for the position image and the captured data 903 or the compressed captured data 905 in distribution, the time selection screen displays past times as choices and accepts selection by the user.

Figure 12:
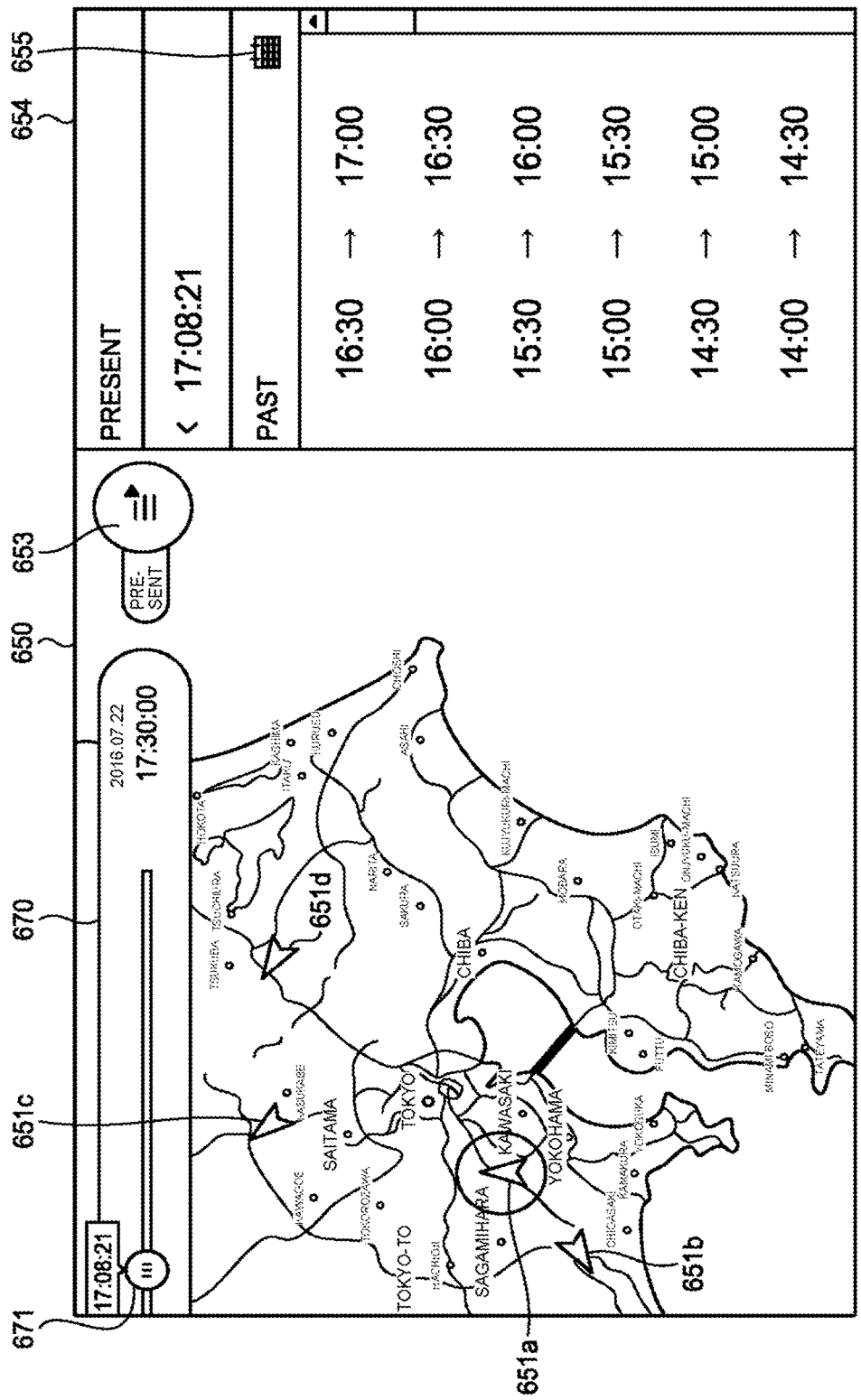
FIG. 12 is a diagram illustrating an example of a screen image of a time selection screen in the first embodiment.

FIG. 12 is a diagram illustrating an example of a screen image of a time selection screen 654 in the present embodiment. In the example illustrated in FIG. 12, the time selection screen 654 is displayed on a right side in the position image reproduction area 650. The screen image in FIG. 12 is an example, and the time selection screen 654 may be displayed as a separate screen from the position image reproduction area 650.

As illustrated in FIG. 12, past times selectable by the user are displayed on the time selection screen 654 as choices. In FIG. 12, the past times are divided in units of 30 minutes into the choices, as an example. A time may be made selectable back in the past date by the user pressing a calendar button 655.

Other configurations of the distribution screen illustrated in FIG. 12 are similar to the configurations described in FIG. 11. In FIG. 12, the captured data reproduction area 660 is not displayed because the position is shifted to the left of the screen. However, a configuration to continuously display the captured data reproduction area 660 by reducing the entire screen or the like may be employed.

The time selection screen 654 may be a screen on which a further past time than a rewindable time with the seek bar 670 is selected. For example, assume that the rewindable time with the seek bar 670 is set to a maximum of thirty minutes in the past, and a past time prior to thirty minutes may be selected on the time selection screen. Further, the time selection screen 654 may be a screen not only displaying past times as choices but also capable of accepting an input of an arbitrary time by the user. For example, the seek bar 670 and the time selection screen 654 can be differently used in such a manner that the seek bar 670 is used when the user goes back to a past time little by little while confirming the captured data 903 or the compressed captured data 905, and the time selection screen 654 is used when the user goes back to the past in units of a longer time. In the present embodiment, the time selection screen 654 is separately provided from the seek bar 670, and thus the user can more efficiently select a past time.

Referring back to FIG. 5, the request acceptor 25 sends an instruction of display of the time selection screen to the distributor 28 when accepting the display request of the time selection screen from the client terminal 50.

The selection of a display target time means accepting, by the client terminal 50, selection of a display target time by the user on the time selection screen 654 illustrated in FIG. 12.

Figure 13:
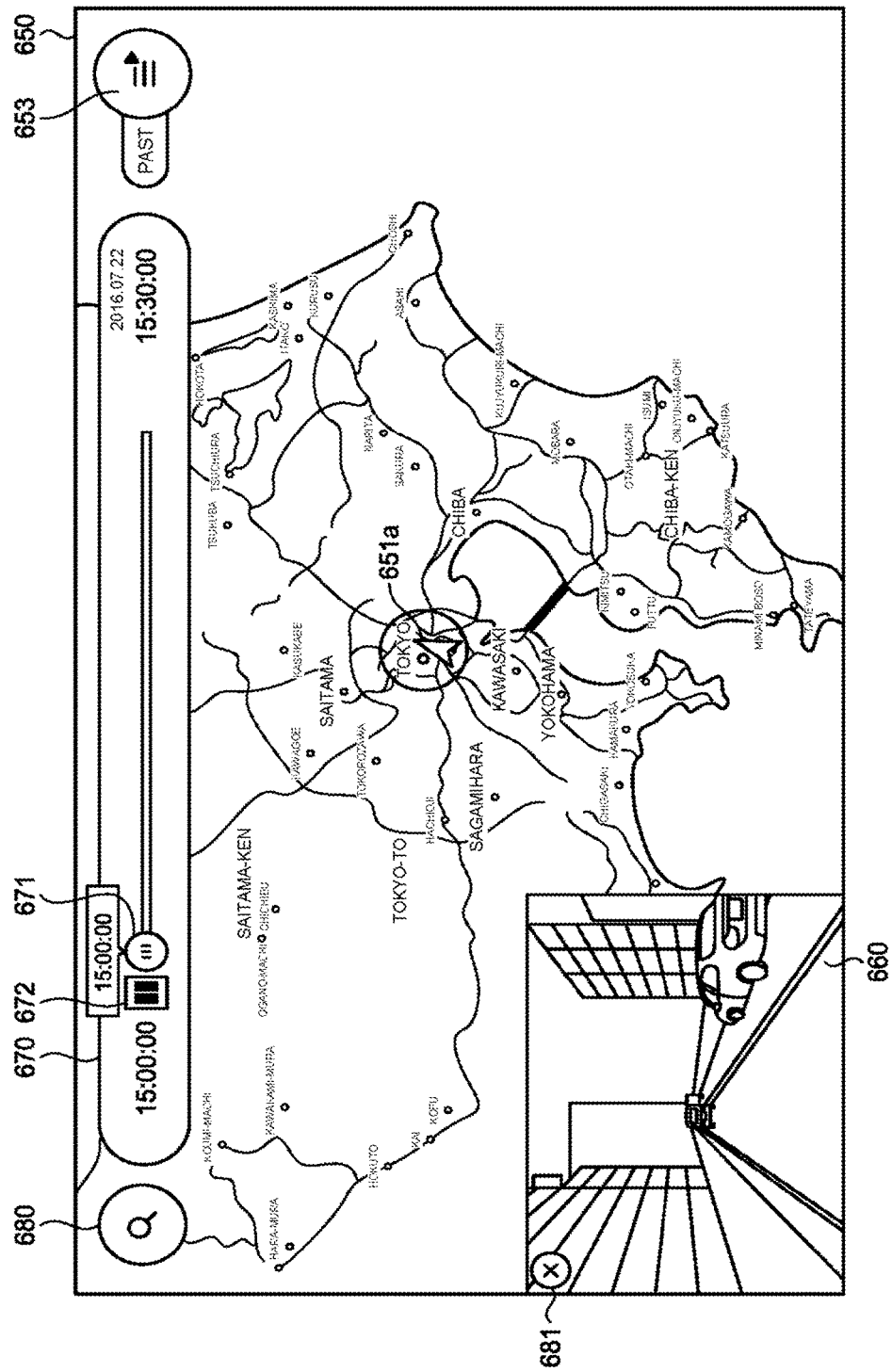
FIG. 13 is a diagram illustrating an example of a screen image of a screen displayed upon time selection in the first embodiment.

FIG. 13 is a diagram illustrating an example of a screen image of the screen displayed upon receipt of time selection in the present embodiment. When the user selects the choice "15:00→15:30" on the time selection screen 654 illustrated in FIG. 12, the position image and the expanded compressed captured data 905 on "15:00" as a start time of a time range selected by the user are displayed, as illustrated in FIG. 13. Other configurations of the distribution screen illustrated in FIG. 13 are similar to the configurations described in FIG. 11.

Referring back to FIG. 5, the request acceptor 25 sends the time selected by the user and the vehicle ID including the user in the open range to the calculator 26 and the distributor 28 when accepting the selection of the display target time by the user from the client terminal 50. Further, the request acceptor 25 sends the time selected by the user to the determiner 27.

Further, the request acceptor 25 sends an instruction of captured data distribution termination to the distributor 28 when accepting the captured data distribution termination request from the client terminal 50.

The captured data distribution termination request is a request of termination of distribution of the captured data 903 or the compressed captured data 905. The client terminal 50 described below accepts the request of termination of the distribution of the captured data 903 or the compressed captured data 905 by the user on the screen that displays the distributed image. For example, the user selects and clicks, with a mouse, the close button 681 provided in the captured data reproduction area 660 on the screen illustrated in FIG. 11 to make the captured data distribution termination request.

Referring back to FIG. 5, the request acceptor 25 sends an instruction of image distribution termination to the distributor 28 when accepting the image distribution termination request from the client terminal 50.

The image distribution termination request is a request of termination of distribution of the position image and the captured data 903 or the compressed captured data 905. For example, the user closes the screen of the web browser that displays the position image and the captured data 903 or the compressed captured data 905 to make the image distribution termination request.

The calculator 26 identifies a traveling direction of the vehicle 150, from the position of the in-vehicle device 10 of a specific time, and the position of the in-vehicle device 10 of a time immediately before the specific time, and calculates a speed. To be specific, when the request acceptor 25 accepts the position display request, the calculator 26 acquires the vehicle ID and the desired time of the user from the request acceptor 25.

In this case, the specific time is the desired time at which display of the position image is requested by the user, the desired time having been acquired by the calculator 26 from the request acceptor 25.

Further, a time immediately before the specific time is, for example, a time at which the position information is recorded prior to the specific time. Using the position information DB 902 illustrated in FIG. 6 as an example, when the user requests display of the position image at the point of time of "17:00:04 on 2016/7/22", the time immediately before the specific time is "17:00:02 on 2016/7/22". Further, when the time interval of acquisition of the position information is short, and detection of a moving amount of the position of the in-vehicle device 10 is difficult between the specific time and the time immediately before the specific time, the calculator 26 may employ a configuration to use the position information of a past time by a fixed time from the specific time, for identification of the traveling direction and calculation of the speed.

Referring back to FIG. 5, the calculator 26 searches the position information DB 902 for the position information of the specific time, of the in-vehicle device 10 associated with the acquired vehicle ID, and the position information of the in-vehicle device 10 of the time immediately before the specific time. The calculator 26 then identifies the traveling direction of the vehicle 150 corresponding to the acquired vehicle ID, from change of the position information of the in-vehicle device 10 from the time immediately before the specific time to the specific time. The calculator 26 corresponds to the identifier. The technique to identify the traveling direction of the vehicle 150 is not limited to the calculation. For example, the identifier may employ a configuration to acquire an acceleration of the vehicle 150 from the in-vehicle device 10, and to identify the traveling direction of the vehicle 150 from the acceleration.

Further, the calculator 26 calculates the speed of the vehicle 150 from a moving distance of the in-vehicle device 10 from the time immediately before the specific time to the specific time, and the time from the time immediately before the specific time to the specific time.

When there is a plurality of the vehicle IDs acquired by the calculator 26 from the request acceptor 25, the calculator 26 identifies the traveling directions of the vehicles 150 from the position information associated with each of the plurality of vehicle IDs, and calculates the drive speeds. The calculator 26 similarly identifies the traveling direction of the vehicle 150 and calculates the speed when the request acceptor 25 accepts the request such as the rewinding request, the fast-forwarding request, or the selection of the display target time. The calculator 26 sends the identified traveling direction and the calculated speed of the vehicle 150 to the distributor 28 in association with the vehicle ID and the time.

The determiner 27 acquires the desired time of the user from the request acceptor 25 when the request acceptor 25 accepts the captured data display request. The determiner 27 determines whether the desired time of the user is the past time within a certain time from the present time, or the past time prior to the certain time. The "past time within a predetermine time from the present time" includes the present time. The "certain time" is equal to the certain time that serves as a reference when the compressor 24 compresses the captured data 903 to generate the compressed captured data 905. As described above, the certain time in the present embodiment is three minutes.

That is, the determiner 27 of the present embodiment determines whether the desired time of the user is the past time within three minutes from the present time or the past time prior to three minutes. The determiner 27 sends, to the distributor 28, a determination result as to whether the desired time of the user is the past time within three minutes from the present time or the past time prior to three minutes.

The determiner 27 similarly determines whether the time acquired from the request acceptor 25 is the past time within three minutes from the present time or the past time prior to three minutes, and sends the determination result to the distributor 28, when the request acceptor 25 accepts the request such as the rewinding request, the fast-forwarding request, or the selection of the display target time.

The distributor 28 distributes the captured data 903 or the compressed captured data 905 to the client terminal 50 in a reproducible manner on the same screen as the position image.

The "distribution in a reproducible manner on the same screen" is to generate single screen layout definition information for arranging a plurality of contents for being displayed on the same screen in the client terminal 50, and to distribute the generated screen layout definition information to the client terminal 50.

Here, the screen layout definition information is data that defines layout on the screen, of the content to be displayed on the screen, and corresponds to, for example, data in an HTML format.

Further, in the screen layout definition information, the distributor 28 arranges an image for accepting an operation of the user such as the seek bar 670 for reproduction control of the position image and the captured data 903 or the compressed captured data 905, on the same screen as the position image and the captured data 903 or the compressed captured data 905, and distributes the image to the client terminal 50.

The position image reproduction area 650, the captured data reproduction area 660, the seek bar 670, the selection screen display button 653, and the search button 680 in the image distributed by the image distribution server 20, illustrated in FIG. 11, are examples of content to be displayed on the screen, and are defined by the screen layout definition information generated by the distributor 28.

When the request acceptor 25 accepts the position display request, the distributor 28 acquires, from the request acceptor 25, the vehicle ID of the open target and the desired time of the user. The distributor 28 searches the position information DB 902 for the position information of the in-vehicle device 10 associated with the vehicle ID of the open target and the desired time of the user.

The distributor 28 maps the map data 900 and the position information of each of the in-vehicle devices 10 found in the searched position information DB 902. The distributor 28 then displays the icon that indicates the position of the in-vehicle device 10 of the desired time of the user on the map data 900 to generate the position image.

Further, the distributor 28 acquires, from the calculator 26, the traveling direction and the speed of the vehicle 150 associated with the vehicle ID. The distributor 28 causes the direction of the icon that indicates the position of the in-vehicle device 10 to be the same direction as the traveling direction of the vehicle 150. When the traveling direction of the vehicle 150 is changed as time proceeds, the distributor 28 changes the direction of the icon that indicates the position of the in-vehicle device 10 on the position image in accordance with the traveling direction of the vehicle 150.

Further, the distributor 28 changes a display form of the icon that indicates the position of the in-vehicle device 10 on the position image according to the speed of the vehicle 150. The "changing a display form of the icon" is to change definition of the display form of the icon in the screen layout definition information. The definition of the display form is, for example, definition of a color. To be specific, the distributor 28 may employ a configuration to change the definition of the color of the icon in the screen layout definition information in such a manner that the color is red when the speed of the vehicle 150 is 20 km/h or less, the color is yellow when the speed is faster than 20 km/h and 40 km/h or less, and the color is green when the speed is faster than 40 km/h.

Here, details of the position image distributed to the client terminal 50 by the distributor 28 will be described. As illustrated in FIG. 11, the position image distributed by the distributor 28 is displayed in the position image reproduction area 650. In the present embodiment, the distributor 28 generates the screen layout definition information for displaying the position image reproduction area 650, the seek bar 670, the selection screen display button 653, and the search button 680 and distributes the generated information, when the request acceptor 25 accepts the position display request. The distributor 28 further generates the screen layout definition information for displaying the captured data reproduction area 660 and distributes the generated information, when the request acceptor 25 accepts the captured data display request.

Further, as illustrated in FIG. 11, the position image is an image in which icons 651a to 651d that indicate positions of the in-vehicle devices 10 are displayed on the map data 900. Hereinafter, the icons 651a to 651d are referred to as icon 651 when they are collectively called.

The icon 651 displayed on the position image is generated from the position information associated with the vehicle ID that includes, in the open range, the user who has logged in the client terminal 50 that displays the position image.

For example, the user who has logged in the client terminal 50 is the user with the user ID "USERA01". In the example of the open range DB 908 illustrated in FIG. 10, the vehicle IDs that are the open targets to the A company users are "A0001", "B0001", "C0001", and "D0001".

The icon 651 in FIG. 11 is an image generated from the position information of the vehicle ID that is the open target to the user with the user ID "USERA01". The icon 651a in FIG. 11 indicates the position of the in-vehicle device 10A mounted in the vehicle 150A with the vehicle ID "A0001". Further, the icon 651b indicates the position of the in-vehicle device 10B mounted in the vehicle 150B with the vehicle ID "B0001". The icon 651c indicates the position of the in-vehicle device 10C mounted in the vehicle 150C with the vehicle ID "C0001". The icon 651d indicates the position of the in-vehicle device 10D mounted in the vehicle 150D with the vehicle ID "D0001".

As indicated by the seek bar 670 and the pointer 671 of the seek bar 670, the icons 651 of the position image during reproduction indicate the positions of the in-vehicle devices 10A to 10D of point of time "17:07:15 on Jul. 22, 2016".

The icon 651a in FIG. 11 faces the northeast direction. This indicates that the traveling direction of the vehicle 150A of the point of time "17:07:15 on Jul. 22, 2016", the vehicle 150A having the in-vehicle device 10A mounted therein, and the traveling direction having been calculated from the position information by the calculator 26, is the northeast direction. Other icons 651b to 651d respectively face similar directions to the traveling directions of the vehicles 150B to 150D of the point of time "17:07:15 on Jul. 22, 2016", the traveling direction having been calculated from the position information by the calculator 26.

Further, the distributor 28 respectively displays the icons 651 by colors according to the speed of the vehicles 150 of the point of time "17:07:15 on Jul. 22, 2016", the speed having been calculated from the position information by the calculator 26.

When the request acceptor 25 accepts the captured data display request, the distributor 28 acquires the desired time of the user and the vehicle ID from the request acceptor 25.

Further, the distributor 28 acquires, from the determiner 27, the determination result as to whether the desired time of the user is the present time, the past time within three minutes from the present time, or the past time prior to three minutes.

When the desired time of the user is the present time or the past time within three minutes from the present time, the distributor 28 searches the attribute DB 904, using the vehicle ID and the desired time of the user acquired from the request acceptor 25, as the search conditions. The distributor 28 identifies the file name of the captured data corresponding to the vehicle ID and the desired time of the user acquired from the request acceptor 25. The distributor 28 reads the captured data 903 corresponding to the file name of the found captured data from the HDD 204, and distributes the read data to the client terminal 50.

When the desired time of the user is the past time prior to three minutes, the distributor 28 searches the compressed data attribute DB 906, using the vehicle ID and the desired time of the user acquired from the request acceptor 25, as the search conditions. The distributor 28 identifies the file name of the compressed captured data corresponding to the vehicle ID and the desired time of the user acquired from the request acceptor 25. The distributor 28 reads the found compressed captured data 905 from the HDD 204, and distributes the read data to the client terminal 50.

The captured data 903 distributed by the distributor 28 is displayed in the captured data reproduction area 660 illustrated in FIG. 11. In the example illustrated in FIG. 11, the user who has logged in the client terminal 50 selects the icon 651a, of the icons 651 displayed in the position image, and makes the captured data display request. Further, the time indicated by the pointer 671 of the seek bar 670 is "17:07:15 on Jul. 22, 2016". In this case, the request acceptor 25 receives, from the client terminal 50, the desired time of user "17:07:15 on Jul. 22, 2016", and the vehicle ID "A0001" corresponding to the icon 651a.

Here, assume that "17:07:15 on Jul. 22, 2016" is the present time. In this case, the determiner 27 determines that the desired time of the user is the present time. The distributor 28 searches the attribute DB 904, using the vehicle ID "A0001" and "17:07:15 on Jul. 22, 2016" as conditions, reads the found captured data 903 from the HDD 204, and distributes the read data to the client terminal 50.

The image distribution system 1 of the present embodiment performs the processing from transmitting the captured data and the position information to the image distribution server 20 after the imaging device 101 of the in-vehicle device 10 performs capturing, storing the captured data and the position information in the HDD 204 after the conversion processing, to distributing the captured data and the position information in response to the request of the user, at high speed. Therefore, when accepting the captured data display request, specifying the present time, from the user, the image distribution server 20 distributes the latest captured data 903 stored in the HDD 204, as realtime captured data 903.

When the captured data 903 corresponding to the present time has not yet stored in the HDD 204, the distributor 28 distributes the latest one, of the captured data 903 stored in the HDD 204. Alternatively, the distributor 28 may employ a configuration to stand by for the distribution processing until the captured data 903 of the specified time is stored in the HDD 204.

When the request acceptor 25 accepts the pause request, the distributor 28 receives an instruction of pause from the request acceptor 25. When only the position image is displayed on the screen at the point of time when the pause request is accepted, the distributor 28 stops the position image while remaining displaying the pause request in a state of when accepted. Further, when the position image and the captured data 903 or the compressed captured data 905 are displayed on the screen at the point of time when the pause request is accepted, the distributor 28 stops the position image and the captured data 903 or the compressed captured data 905 while remaining displaying the pause request in the state of when accepted.

When the request acceptor 25 accepts the rewinding request during distribution of the position image, the distributor 28 acquires the past arbitrary time specified by the user from the request acceptor 25. The distributor 28 searches the position information DB 902, and acquires the position information associated with the vehicle ID including, in the open range, the user who has logged in the client terminal 50 in distribution, and the past arbitrary time specified by the user.

Further, the distributor 28 acquires, from the calculator 26, the traveling direction and the speed of the vehicle 150 of the past arbitrary time specified by the user. The distributor 28 maps the icon 651 that indicates the position of the vehicle 150 of the past arbitrary time specified by the user with the map data 900 to generate the position image. Further, the distributor 28 generates the screen layout definition information in which the position and the color of the icon 651 on the position image are changed according to the traveling direction and the speed of the vehicle 150. The distributor 28 distributes, to the client terminal 50, the position image and the screen layout definition information of the past arbitrary time specified by the user.

Further, when the rewinding request is made during distribution of the captured data 903 or the compressed captured data 905, the distributor 28 acquires, from the request acceptor 25, the past arbitrary time specified by the user, and the vehicle ID of the captured data 903 or the compressed captured data 905 in distribution. The distributor 28 then generates the position image and the screen layout definition information of the past arbitrary time specified by the user, similarly to the case where the request acceptor 25 accepts the rewinding request during distribution of the position image.

Further, the distributor 28 acquires, from the determiner 27, the determination result as to whether the past arbitrary time specified by the user is the past time within three minutes or the past time prior to three minutes. The distributor 28 searches the attribute DB 904 or the compressed data attribute DB 906 according to the acquired determination result, and identifies the captured data 903 or the compressed captured data 905 associated with the vehicle ID of the captured data 903 or the compressed captured data 905 in distribution. The distributor 28 then distributes, to the client terminal 50, the position image and the captured data 903 or the compressed captured data 905 and the screen layout definition information of the past arbitrary time specified by the user.

When the request acceptor 25 accepts the fast-forwarding request during distribution of the position image by the distributor 28, the distributor 28 distributes, to the client terminal 50, the position image and the screen layout definition information of the past arbitrary time specified by the user. Further, when the request acceptor 25 accepts the fast-forwarding request during distribution of the captured data 903 or the compressed captured data 905 by the distributor 28, the distributor 28 distributes, to the client terminal 50, the position image and the captured data 903 or the compressed captured data 905, and the screen layout definition information, of the past arbitrary time specified by the user.

When the request acceptor 25 accepts the display request of the time selection screen, the distributor 28 receives an instruction of display of the time selection screen from the request acceptor 25. In this case, the distributor 28 distributes the screen layout definition information that defines the time selection screen to the client terminal 50 to enable the time selection screen to be displayable on the screen.

When the request acceptor 25 accepts the selection of the display target time, the distributor 28 acquires, from the request acceptor 25, the time selected by the user and the vehicle ID including the user in the open range. The distributor 28 generates the position image of the time selected by the user, by a similar technique to that of the case of the rewinding request, and distributes the generated position image to the client terminal 50. Further, the distributor 28 distributes, to the client terminal 50, the captured data 903 or the compressed captured data 905 of the time selected by the user according to the determination of the determiner 27.

Further, when accepting the instruction of captured data distribution termination from the request acceptor 25, the distributor 28 terminates distribution of the captured data 903 or the compressed captured data 905 in distribution. When accepting the instruction of image distribution termination request from the request acceptor 25, the distributor 28 terminates distribution of the position image and the captured data 903 or compressed captured data 905 in distribution.

Next, details of the client terminal 50 will be described.

The client terminal 50 has a hardware configuration of a normal computer that includes a control device such as CPU, a storage device such as a ROM and a random access memory (RAM), an external storage device such as an HDD or a CD drive device, a display device, and input devices such as a keyboard and a mouse. Further, the client terminal 50 may be a smart phone or a tablet terminal that has a hardware configuration similar to that of the in-vehicle device 10.

Figure 14:
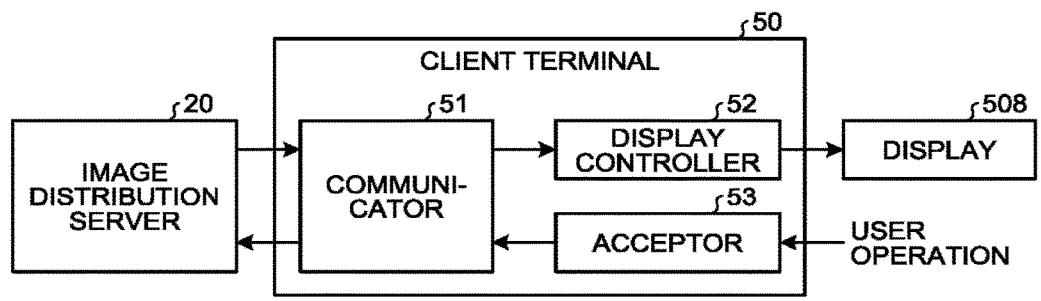
FIG. 14 is a block diagram illustrating an example of a functional configuration of a client terminal in the first embodiment.

FIG. 14 is a block diagram illustrating an example of a functional configuration of the client terminal 50 according to the first embodiment. As illustrated in FIG. 14, the client terminal 50 includes a communicator 51, a display controller 52, and an acceptor 53.

The communicator 51 receives distribution of the image from the image distribution server 20. To be specific, the communicator 51 receives the screen layout definition information, the position image, and the captured data 903 or the compressed captured data 905 from the image distribution server 20.

When receiving the distribution of the image from the image distribution server 20, the communicator 51 sends the distributed screen layout definition information, the distributed position image, and the distributed captured data 903 or compressed captured data 905 to the display controller 52.

Further, when the acceptor 53 accepts the request from the user, the communicator 51 acquires the request from the user, which has been accepted by the acceptor 53, the user ID of the user, and the desired time, and transmits the acquired information to the image distribution server 20.

The display controller 52 displays the image distributed from the image distribution server 20 on a display 508. The image distribution server 20 transmits the screen layout definition information, the position image, the captured data 903 or the compressed captured data 905, and thus the display controller 52 interprets the screen layout definition information and forms a display screen, so that a screen including the position image reproduction area 650, the captured data reproduction area 660, the seek bar 670, the selection screen display button 653, and the search button 680 is displayed on the display 508, like the screen image illustrated in FIG. 11.

The acceptor 53 accepts the operations to make various requests, which have been performed by the user to the client terminal 50. For example, the acceptor 53 accepts the requests such as the position display request, the captured data display request, the pause request, the rewinding request, the fast-forwarding request, the display request of the time selection screen, and the selection of the display target time, of the user.

For example, when the user accesses a certain web site from a web browser and logs in to the certain web site, the acceptor 53 accepts the operation as the position display request. Further, a configuration to provide a position display request button on an initial search screen, and to allow the acceptor 53 to accept an operation as the position display request when the user performs the operation to select and click the button with a mouse, may be employed.

A configuration to enable the user to input a desired time on the screen when the user makes the position display request may be employed. Further, when the user makes the position display request without inputting or selecting the time, the acceptor 53 accepts the present time as the specified position display request. When accepting the position display request, the acceptor 53 sends the position display request, the user ID of the user who has presently logged in, and the desired time of the user or the present time to the communicator 51.

When the user performs an operation to select and double-click any of the icons 651 on the position image with a mouse, the acceptor 53 accepts the captured data display request, specifying the vehicle ID of the vehicle 150 corresponding to the icon 651. Further, the acceptor 53 accepts the time of the image that has been reproduced at the point of time when the user has performed the operation, as the desired time of the user. When accepting the captured data display request, the acceptor 53 sends the captured data display request, the desired time of the user, and the vehicle ID specified by the user to the communicator 51.

Further, when the user performs an operation to select and click the pause button 672 on the position image with a mouse, the acceptor 53 accepts the pause request. When accepting the pause request, the acceptor 53 sends the pause request to the communicator 51.

Further, when the user performs an operation to select and move, with a mouse, the pointer 671 of the seek bar 670 on the position image in a right and left direction, the acceptor 53 accepts the rewinding request or the fast-forwarding request. When accepting the rewinding request or the fast-forwarding request, the acceptor 53 sends, to the communicator 51, the rewinding request or the fast-forwarding request, and the arbitrary time specified with the pointer 671 by the user. Further, when accepting the rewinding request or the fast-forwarding request during distribution of the captured data 903 or the compressed captured data 905, the acceptor 53 sends, to the communicator 51, the vehicle ID of the captured data 903 or the compressed captured data 905 in distribution, in addition to the arbitrary time specified with the pointer 671 by the user.

Further, when the user performs an operation to select and click the selection screen display button 653 on the position image with a mouse, the acceptor 53 accepts the display request of the time selection screen. When accepting the display request of the time selection screen, the acceptor 53 sends the display request of the time selection screen to the communicator 51.

Then, when the user performs an operation to select and click any of the choices displayed on the time selection screen with a mouse, the acceptor 53 accepts the selection of the display target time. When accepting the selection of the display target time, the acceptor 53 sends the time selected by the user to the communicator 51.

Further, when the user performs an operation to select and click the close button 681 in the captured data reproduction area 660 with a mouse, the acceptor 53 accepts the captured data distribution termination request. When accepting the captured data distribution termination request, the acceptor 53 sends the captured data distribution termination request to the communicator 51.

Further, when the user performs an operation to close the screen of the web browser, the acceptor 53 accepts the image distribution termination request. Alternatively, a configuration to display a log-out button (not illustrated) on the screen may be employed. When accepting the image distribution termination request, the acceptor 53 sends the image distribution termination request to the communicator 51.

When the client terminal 50 includes a touch panel, a configuration to cause the acceptor 53 to accept an operation to touch a touch panel by the user with a finger or the like, in place of a click, may be employed.

Next, capturing processing by the in-vehicle device 10 of the present embodiment configured as described above will be described.

Figure 15:
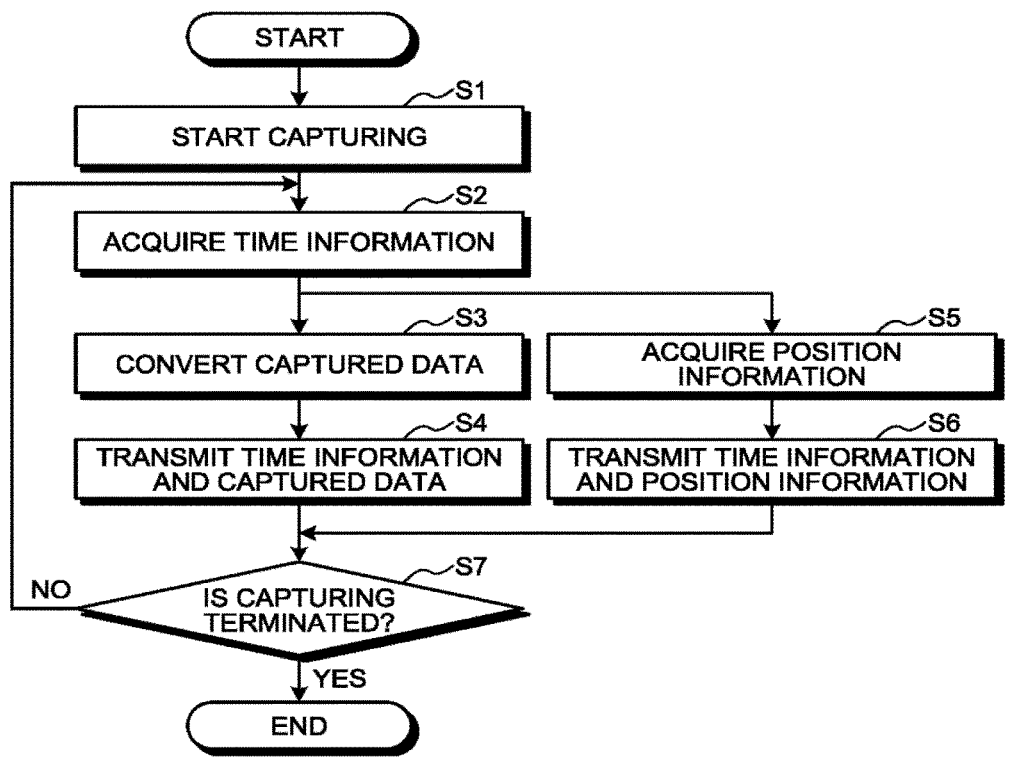
FIG. 15 is a flowchart illustrating an example of a flow of capturing processing pertaining to the in-vehicle device in the first embodiment.

FIG. 15 is a flowchart illustrating an example of a flow of capturing processing concerning the in-vehicle device 10 in the present embodiment. The processing of the flowchart illustrated in FIG. 15 is started when an application of the capturing processing is started in the in-vehicle device 10, for example.

The imaging device 101 of the in-vehicle device 10 captures surroundings of the vehicle 150 (S1). The captured data acquirer 11 acquires the data captured by the imaging device 101. The captured data acquirer 11 sends the acquired captured data to the captured data converter 12.

The time information acquirer 13 acquires the time information that is the time of when the imaging device 101 has captured the data from the clock circuit 105 (S2). The time information acquirer 13 sends the acquired time information to the captured data converter 12 and the position information acquirer 14.

The captured data converter 12 converts the format of the captured data in order to efficiently transmit the captured data to the image distribution server 20 (S3). The captured data converter 12 sends the captured data converted for transmission and the time information to the transmitter 15 in association with each other.

The transmitter 15 transmits the captured data converted for transmission and the time information, which have been acquired from the captured data converter 12, to the image distribution server 20 in association with each other (S4).

The position information acquirer 14 acquires the position information from the GPS receiver 106 (S5). The position information acquirer 14 sends the position information and the time information to the transmitter 15 in association with each other.

The transmitter 15 transmits the position information and the time information, which have been acquired from the position information acquirer 14, to the image distribution server 20 in association with each other (S6).

When the imaging device 101 does not terminate the capturing (S7 "No"), the processing returns to the processing of S2, and the time information acquirer 13 acquires the time information that is the time of when the imaging device 101 has captured the data, from the clock circuit 105. The in-vehicle device 10 repeats the processing of S2 to S6 while the imaging device 101 continues the capturing.

When the imaging device 101 terminates the capturing (S7 "Yes"), the capturing processing of the flowchart is terminated. When the imaging device 101 terminates the capturing is when the application of the capturing processing is terminated in the in-vehicle device 10 or when a power source of the in-vehicle device 10 is turned off, for example.

Next, processing in which the image distribution server 20 receives, converts, and stores the captured data, the position information, and the time information transmitted by the in-vehicle device 10 will be described.

Figure 16:
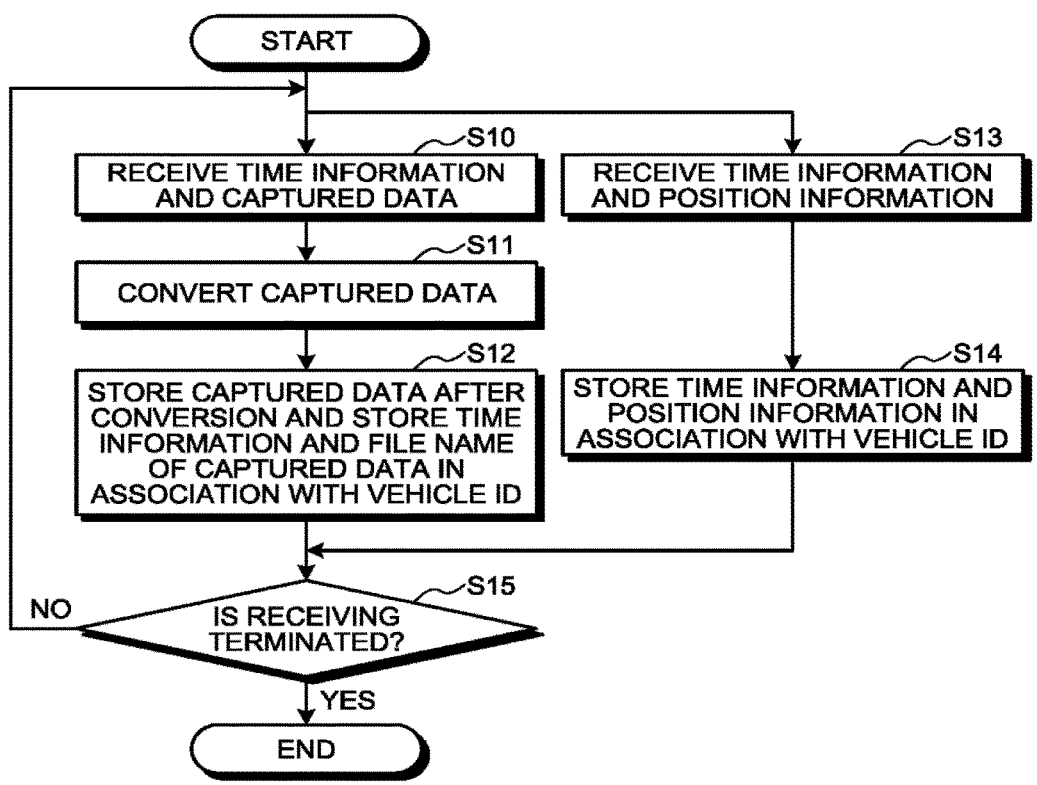
FIG. 16 is a flowchart illustrating an example of a flow of processing from reception to storage of data pertaining to the image distribution server in the first embodiment.

FIG. 16 is a flowchart illustrating an example of a flow of processing from receipt to storage of data, concerning the image distribution server 20 of the present embodiment.

The receiver 21 receives, from the in-vehicle device 10, the captured data converted for transmission to the image distribution server 20 and the time information associated with the captured data converted for transmission (S10). The receiver 21 sends, to the captured data converter 23, the received captured data converted for transmission to the image distribution server 20, the received time information associated with the captured data converted for transmission, and the information that identifies the in-vehicle device 10 as a transmission source.

The captured data converter 23 converts the captured data converted for transmission to the image distribution server 20 into the format for streaming distribution, i.e., the captured data 903 in the HLS format or the like (S11).

The captured data converter 23 stores the captured data 903 after conversion to the HDD 204. Further, the captured data converter 23 stores the time information, the vehicle ID acquired from the vehicle ID DB 901, and the file name of the captured data 903 converted into the format for streaming distribution to the attribute DB 904 in association with one another (S12).

The receiver 21 receives, from the in-vehicle device 10, the position information and the time information associated with the position information (S13). The receiver 21 sends, to the position information linker 22, the received position information, the received time information associated with the position information, and the information that identifies the in-vehicle device 10 as a transmission source.

The position information linker 22 stores the position information and the time information associated with the position information, and the vehicle ID acquired from the vehicle ID DB 901, to the position information DB 902 in association with one another (S14).

When receipt of the captured data, the position information, and the time information from the in-vehicle device 10 continues (S15 "No"), the processing returns to the processing of S10, and the receiver 21 receives, from the in-vehicle device 10, the captured data converted for transmission to the image distribution server 20, and the time information associated with the captured data converted for transmission.

When receipt of the captured data, the position information, and the time information from the in-vehicle device 10 is terminated (S15 "Yes"), the processing of the flowchart is terminated.

Next, processing of compressing the captured data 903 by the image distribution server 20 in the present embodiment will be described.

Figure 17:
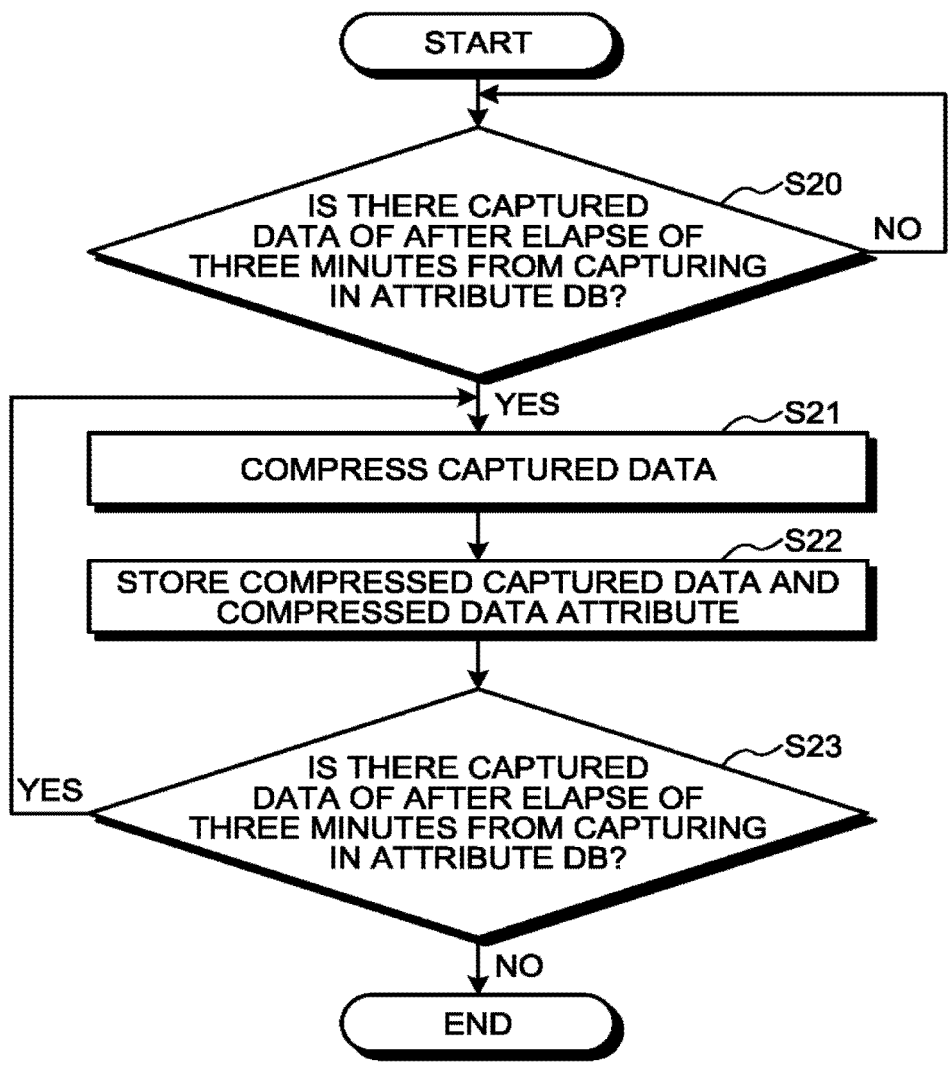
FIG. 17 is a flowchart illustrating an example of a flow of processing of compressing captured data pertaining to the image distribution server in the first embodiment.

FIG. 17 is a flowchart illustrating an example of a flow of processing of compressing the captured data 903, concerning the image distribution server 20 of the present embodiment.

The compressor 24 compares the time information stored in the item "time" in the attribute DB 904 and the present time, and searches for the captured data 903 of after elapse of a certain time from capturing by the imaging device 101 of the in-vehicle device 10 (S20). The certain time is three minutes in the present embodiment. When there is no captured data 903 of after elapse of three minutes from capturing (S20 "No"), the compressor 24 repeats the comparison between the time information stored in the item "time" in the attribute DB 904 and the present time.

When there is the captured data 903 of after elapse of three minutes from capturing (S20 "Yes"), the compressor 24 compresses the captured data 903 into the file format such as MP4 to generate the compressed captured data 905 (S21).

The compressor 24 stores the generated compressed captured data 905 to the HDD 204. Further, the compressor 24 associates the time associated with the captured data 903 before compression and the vehicle ID, with the file name of the compressed captured data 905 that is the compressed captured data 903, and stores the associated information to the compressed data attribute DB 906 (S22). The compressor 24 deletes the captured data 903 of which compression has been completed, from the HDD 204. Further, the compressor 24 deletes record in the attribute DB 904, the record corresponding to the captured data 903 of which the compression has been completed.

When the compressor 24 searches the attribute DB 904 and finds the captured data of after elapse of three minutes from capturing (S23 "Yes"), the compressor 24 repeats the processing of S21 to S22. Further, when there is no captured data of after elapse of three minutes from capturing (S23 "No"), the processing of the flowchart is terminated.

Next, processing of distributing an image by the image distribution server 20 in the present embodiment will be described.

Figure 18:
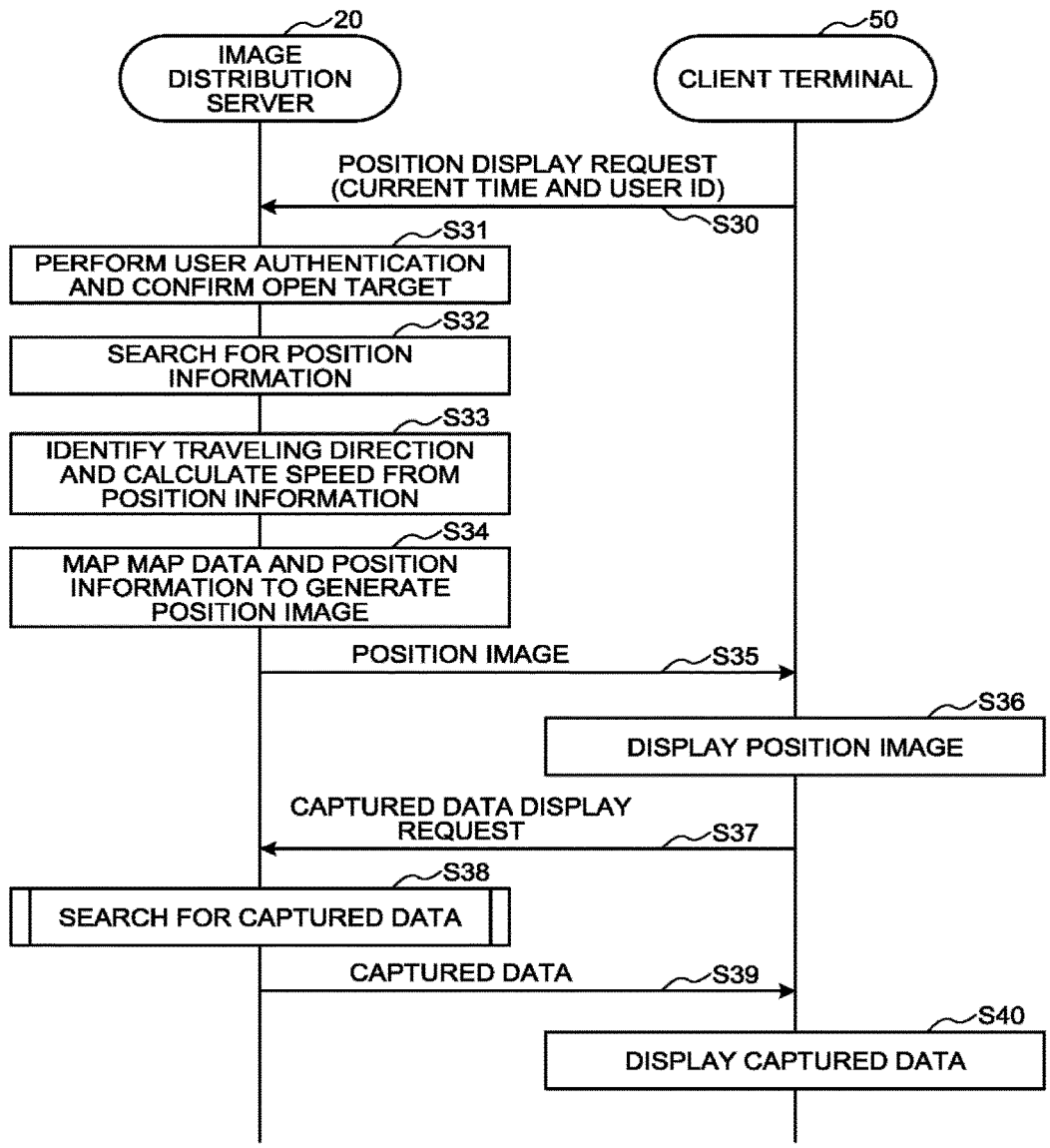
FIG. 18 is a sequence diagram illustrating an example of a flow of processing of distributing an image in the first embodiment.

FIG. 18 is a sequence diagram illustrating an example of a flow of processing of distributing an image in the present embodiment.

The acceptor 53 of the client terminal 50 accepts the position display request of the user. At this time, assume that the user does not input or select a time, and the acceptor 53 accepts the present time as the specified position display request. The acceptor 53 sends, to the communicator 51, the position display request, the user ID of the user who has presently logged in, and the present time. The communicator 51 transmits, to the image distribution server 20, the position display request, the present time, and the user ID of the user who has presently logged in (S30).

The request acceptor 25 of the image distribution server 20 accepts, from the client terminal 50, the position display request, the present time, and the user ID of the user who has presently logged in. The request acceptor 25 searches the authentication DB 907 for the authority of the user with the user ID to perform user authentication. The request acceptor 25 then searches the open range DB 908 for the vehicle ID including the user with the user ID in the open rage, and confirms the vehicle ID of the open target to the user (S31). The request acceptor 25 sends the found vehicle ID and the present time to the calculator 26 and the distributor 28.

The calculator 26 searches the position information DB 902 for the position information of the present time, of the in-vehicle device 10 associated with the vehicle ID acquired from the request acceptor 25, and the position information of the in-vehicle device 10 of a time immediately before the present time. Further, the distributor 28 searches the position information DB 902 for the position information of the present time, of the in-vehicle device 10 associated with the vehicle ID acquired from the request acceptor 25, and the position information of the in-vehicle device 10 of a time immediately before the present time (S32).

The calculator 26 then identifies the traveling direction of the vehicle 150 corresponding to the vehicle ID acquired from the request acceptor 25, from change of the position of the in-vehicle device 10 from the time immediately before the present time to the present time. Further, the calculator 26 calculates the speed of the vehicle 150, from the moving distance of the in-vehicle device 10 from the time immediately before the present time to the present time, and the time from the time immediately before the present time to the present time (S33). The calculator 26 sends the identified traveling direction and the calculated speed of the vehicle 150 to the distributor 28 in association with the vehicle ID.

The distributor 28 maps the map data 900 and the position information of each of the in-vehicle devices 10 found in the searched position information DB 902. The distributor 28 then generates the position image in which the icon 651 that indicates the position of the in-vehicle device 10 of the present time is displayed on the map data 900 (S34). Further, the distributor 28 acquires, from the calculator 26, the traveling direction and the speed of the vehicle 150 associated with the vehicle ID. The distributor 28 generates the screen layout definition information, causing the direction of the icon 651 that indicates the position of the in-vehicle device 10 on the position image to be the same direction as the traveling direction of the vehicle 150. Further, the distributor 28 changes the definition of the color of the icon 651 that indicates the position of the in-vehicle device 10 on the position image, in the screen layout definition information, according to the speed of the vehicle 150.

The distributor 28 distributes the screen layout definition information and the position image to the client terminal 50 through the network (S35). The communicator 51 of the client terminal 50 receives the screen layout definition information and the position image from the image distribution server 20. The communicator 51 sends the distributed screen layout definition information and the distributed position image to the display controller 52.

The display controller 52 interprets the screen layout definition information distributed from the image distribution server 20 to generate the display screen, and displays the position image on the display 508 (S36).

The position image in the present embodiment is changed as time proceeds because the position image is generated from the position information associated with time. Therefore, the processing of S32 to S36 is repeated after the position image of S36 of FIG. 18 is displayed. In the second and subsequent processing of searching for the position information, a time following the time specified in the previous position display request is used as the distribution target time in the second and subsequent position information search processing. For example, when the present time in the processing of S30 is "17:00:03", and the position information DB 902 stores the position information every two seconds, a configuration to use "17:00:05" as the next distribution target time may be employed in the second and subsequent position information search processing. This time is an example, and may be changed according to acquisition frequency of the position information of the position information acquirer 14 of the in-vehicle device 10.

When the user performs an operation to select and click the icon 651 that indicates the position of the vehicle 150 on the position image with a mouse, the acceptor 53 accepts the captured data display request that specifies the vehicle ID of the vehicle 150 corresponding to the icon 651. Further, the acceptor 53 accepts the time of the image that has been reproduced at the point of time when the operation has been made by the user, as the desired time of the user. When accepting the captured data display request, the acceptor 53 sends, to the communicator 51, the captured data display request, the desired time of the user, and the vehicle ID specified by the user. The communicator 51 sends, to the image distribution server 20, the captured data display request, the desired time of the user, and the vehicle ID specified by the user (S37).

The request acceptor 25 of the image distribution server 20 receives, from the client terminal 50, the captured data display request, the desired time of the user, and the vehicle ID specified by the user. The image distribution server 20 searches for the captured data 903 as the distribution target in response to the captured data display request (S38).

The captured data search processing of S38 will be specifically described.

Figure 19:
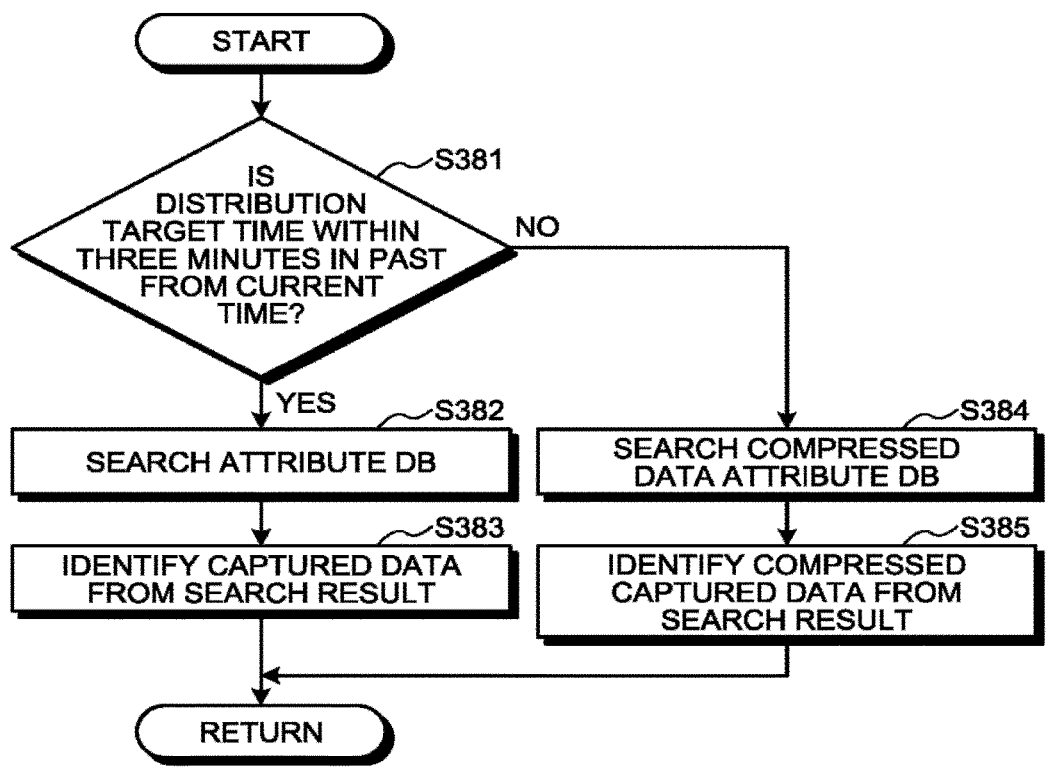
FIG. 19 is a flowchart illustrating an example of a flow of captured data search processing in the first embodiment.

FIG. 19 is a flowchart illustrating an example of a flow of captured data search processing in the present embodiment.

The determiner 27 acquires the desired time of the user from the request acceptor 25. The determiner 27 determines whether the distribution target time is the past time within three minutes from the present time or the past time prior to three minutes, and sends the determination result to the distributor 28.

When the determiner 27 determines that the desired time of the user as the distribution target time is the present time or the past time within three minutes from the present time (S381 "Yes"), the distributor 28 searches the attribute DB 904 for the file name of the captured data, using the vehicle ID and the desired time of the user acquired from the request acceptor 25, as the search conditions (S382). The distributor 28 identifies the captured data 903 as the distribution target from the file name of the captured data in the search result (S383).

Further, when the determiner 27 determines that the desired time of the user is the past time prior to three minutes from the present time (S381 "No"), the distributor 28 searches the compressed data attribute DB 906 for the file name of the compressed captured data, using the vehicle ID and the desired time of the user acquired from the request acceptor 25, as the search conditions (S384). The distributor 28 identifies the compressed captured data 905 as the distribution target, from the file name of the compressed captured data in the search result (S385). Here, the present time is specified, and thus the distributor 28 specifies the captured data 903 as the distribution target.

Here, the processing of the flowchart is terminated, and the processing returns to the processing of the sequence diagram of FIG. 18.

The distributor 28 reads the identified captured data 903 as the distribution target from the HDD 204, and distributes the captured data 903 to the client terminal 50 (S39).

The communicator 51 of the client terminal 50 receives the screen layout definition information and the captured data 903 from the image distribution server 20. The communicator 51 sends the distributed screen layout definition information and the distributed captured data 903 to the display controller 52.

The display controller 52 interprets the screen layout definition information distributed from the image distribution server 20 to generate the display screen, and displays the captured data 903 on the display 508 (S40).

The captured data 903 and the compressed captured data 905 in the present embodiment are moving images, and thus are displayed and reproduced on the display 508. Further, the processing of S38 to S40 is repeated until distribution of the captured data 903 or the compressed captured data 905 is terminated, and the captured data 903 or the compressed captured data 905 is continuously reproduced as time proceeds. In the second and subsequent captured data search, a time following the time used as the search condition in the previous processing is used as the distribution target time. For example, when the present time in the previous processing of S38 is "17:00:10", and the length of the time of the captured data 903 or the compressed captured data 905 distributed in the previous processing of S39 is ten seconds, a configuration to use "17:00:20" as the next distribution target time may be employed in the second and subsequent captured data search processing. The time is an example, and is changed according to the length of the time per file of the captured data 903 or the compressed captured data 905.

Next, various types of request processing from the client terminal 50 to the image distribution server 20 in the present embodiment will be described.

Figure 20:
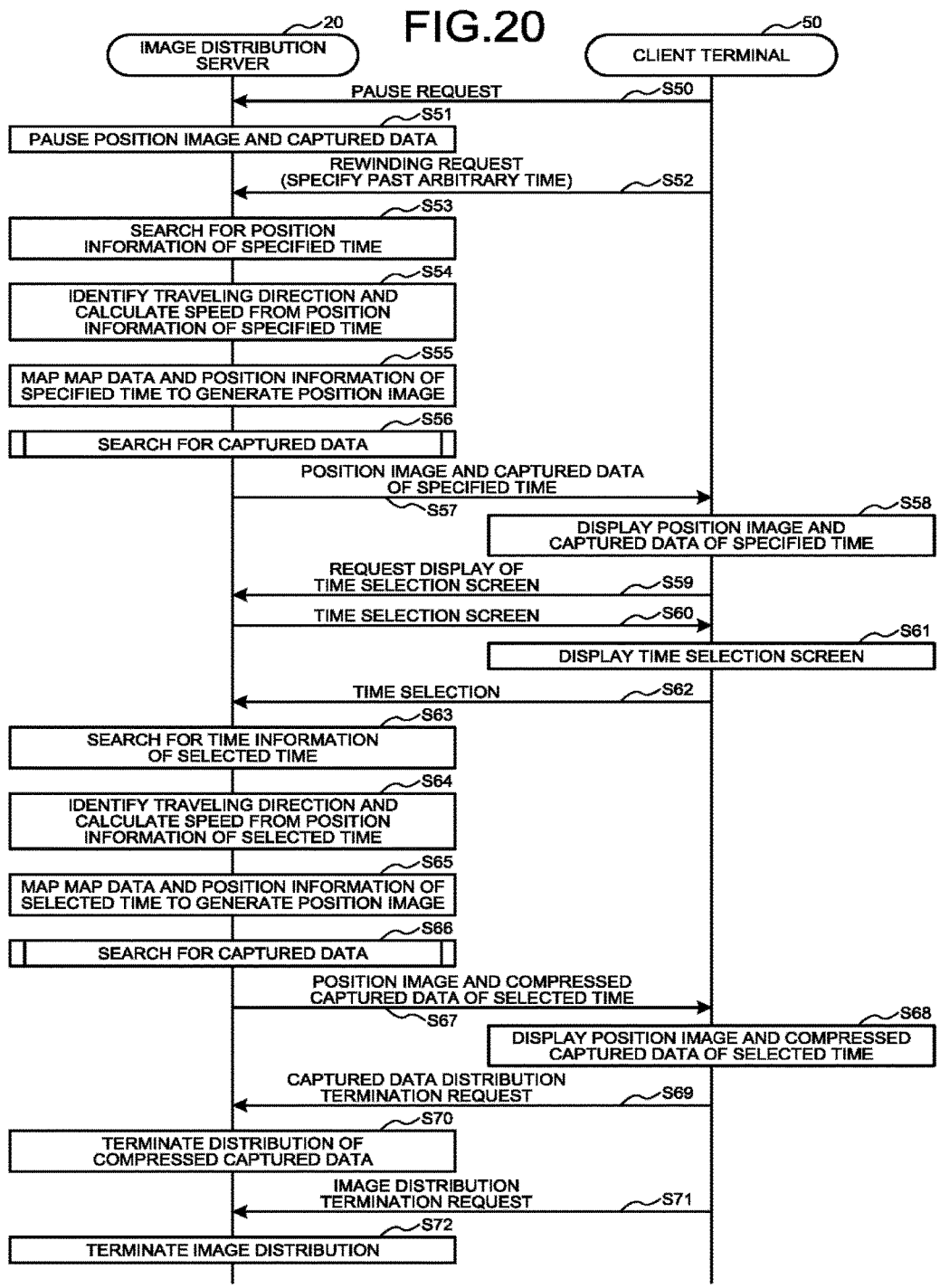
FIG. 20 is a sequence diagram illustrating an example of a flow of various types of request processing in the first embodiment.

FIG. 20 is a sequence diagram illustrating an example of a flow of various types of request processing in the present embodiment. The position image and the captured data 903 are being distributed from the image distribution server 20 to the client terminal 50 on the assumption of the processing of FIG. 20.

When the user performs an operation to select and click the pause button 672 on the position image with a mouse, the acceptor 53 of the client terminal 50 accepts the pause request. When accepting the pause request, the acceptor 53 sends the pause request to the communicator 51. The communicator 51 transmits the pause request to the image distribution server 20 (S50).

The request acceptor 25 of the image distribution server 20 accepts the pause request from the client terminal 50. The request acceptor 25 sends an instruction of pause of the position image and the captured data 903 to the distributor 28. The distributor 28 stops the position image and the captured data 903 while remaining displaying the pause request in a state of when accepted (S51).

Further, when the user performs an operation to select the pointer 671 of the seek bar 670 on the position moving image with a mouse and move the pointer 671 to the left, the acceptor 53 accepts the rewinding request. When accepting the rewinding request, the acceptor 53 sends, to the communicator 51, the rewinding request, the past arbitrary time specified by the user with the pointer 671, and the vehicle ID of the captured data 903 in distribution. The communicator 51 transmits, to the image distribution server 20, the rewinding request, the past arbitrary time specified by the user with the pointer 671, and the vehicle ID of the captured data 903 in distribution (S52).

The request acceptor 25 of the image distribution server 20 accepts, from the client terminal 50, the rewinding request, the past arbitrary time specified by the user with the pointer 671, and the vehicle ID of the captured data 903 in distribution. The request acceptor 25 sends the past arbitrary time specified by the user and the vehicle ID including the user in the open range to the calculator 26 and the distributor 28. The request acceptor 25 further sends the past arbitrary time specified by the user and the vehicle ID of the captured data 903 in distribution to the distributor 28. Further, the request acceptor 25 sends the past arbitrary time specified by the user to the determiner 27.

The calculator 26 acquires the specified past arbitrary time from the request acceptor 25. The calculator 26 searches the position information DB 902, and acquires the vehicle ID including the user in the open target, the user logging in the client terminal 50 in distribution, and the position information associated with the specified past arbitrary time. Further, the calculator 26 acquires the vehicle ID including the user in the open target, the user logging in the client terminal 50 in distribution, and the position information associated with the time immediately before the specified past arbitrary time. Further, the distributor 28 searches the position information DB 902, and acquires the vehicle ID including the user in the open target, the user logging in the client terminal 50 in distribution, and the position information associated with the specified past arbitrary time (S53).

The calculator 26 identifies the traveling direction of the vehicle 150 with the vehicle ID including the user in the open target, of the specified past arbitrary time, from the position of the in-vehicle device 10 of the specified past arbitrary time and the position of the in-vehicle device 10 of the time immediately before the specified past arbitrary time, and calculates the speed (S54).

The distributor 28 acquires, from the calculator 26, the traveling direction and the speed of the vehicle 150 of the specified past arbitrary time. The distributor 28 maps the icon 651 that indicates the position of the vehicle 150 of the specified past arbitrary time and the map data 900 to generate the position image (S55). Further, the distributor 28 generates the screen layout definition information in which the position and the color of the icon 651 on the position image are changed according to the traveling direction and the speed of the vehicle 150.

Further, the determiner 27 determines whether the specified past arbitrary time is the past time within three minutes from the present time or the past time prior to three minutes, and sends the determination result to the distributor 28. The distributor 28 searches the attribute DB 904 or the compressed data attribute DB 906 according to the determination of the determiner 27, and identifies the captured data 903 or the compressed captured data 905 as the distribution target (S56). Details of processing of S56 are similar to the processing described in FIG. 19. Here, the specified past arbitrary time is the past time within three minutes from the present time.

The distributor 28 distributes the position image and the captured data 903 of the specified past arbitrary time, and the screen layout definition information (S57). The communicator 51 of the client terminal 50 receives, from the image distribution server 20, the screen layout definition information, the position image, and the captured data 903. The communicator 51 sends, to the display controller 52, the screen layout definition information, the position image, and the captured data 903 that have been distributed.

The display controller 52 interprets the screen layout definition information distributed from the image distribution server 20 to generate the display screen, and displays the position image and the captured data 903 of the specified past arbitrary time on the display 508 (S58).

Further, when the user performs an operation to select and click the selection screen display button 653 on the position moving image with a mouse, the acceptor 53 accepts the display request of the time selection screen. When accepting the display request of the time selection screen, the acceptor 53 sends the display request of the time selection screen to the communicator 51. The communicator 51 transmits the display request of the time selection screen to the image distribution server 20 (S59).

The request acceptor 25 of the image distribution server 20 sends an instruction of display of the time selection screen to the distributor 28. The distributor 28 distributes, to the client terminal 50, the screen layout definition information for displaying the time selection screen, and choices of past times selectable by the user (S60).

The communicator 51 of the client terminal 50 receives, from the image distribution server 20, the screen layout definition information for displaying the time selection screen, and the choices of past times selectable by the user. The communicator 51 sends, to the display controller 52, the screen layout definition information by which the distributed time selection screen 654 is displayed, and the choices of past times selectable by the user. The display controller 52 interprets the screen layout definition information distributed from the image distribution server 20 to display the time selection screen 654 on the display 508 (S61).

When the user performs an operation to select and click any of the choices displayed on the time selection screen 654 with a mouse, the acceptor 53 accepts selection of the display target time. When accepting selection of the display target time, the acceptor 53 sends the time selected by the user to the communicator 51. The communicator 51 transmits the time selected by the user to the image distribution server 20 (S62).

The request acceptor 25 of the image distribution server 20 sends the time selected by the user and the vehicle ID including the user in the open range to the calculator 26 and the distributor 28. The calculator 26 acquires the selected time from the request acceptor 25. The calculator 26 searches the position information DB 902, and acquires the vehicle ID including the user in the open target, the user logging in the client terminal 50 in distribution, and the position information associated with the selected time. Further, the calculator 26 acquires the vehicle ID including the user in the open target, the user logging in the client terminal 50 in distribution, and the position information associated with the time immediately before the selected time. Further, the distributor 28 searches the position information DB 902, and acquires the vehicle ID including the user in the open target, the user logging in the client terminal 50 in distribution, and the position information associated with the selected time (S63).

The calculator 26 identifies the traveling direction of the vehicle 150 with the vehicle ID including the user in the open target of the selected time, from the position information of the in-vehicle device 10 of the selected time, and the position information of the in-vehicle device 10 of the time immediately before the selected time, and calculates the speed (S64).

Further, the distributor 28 acquires, from the calculator 26, the traveling direction and the speed of the vehicle 150 of the selected time. The distributor 28 maps the icon 651 that indicates the position of the vehicle 150 of the selected time and the map data 900 to generate the position image (S65). Further, the distributor 28 generates the screen layout definition information in which the position and the color of the icon 651 on the position image are changed according to the traveling direction and the speed of the vehicle 150.

Further, the determiner 27 determines whether the selected time is the past time within three minutes from the present time or the past time prior to three minutes, and sends the determination result to the distributor 28. The distributor 28 searches the attribute DB 904 or the compressed data attribute DB 906 according to the determination of the determiner 27, and identifies the captured data 903 or the compressed captured data 905 as the distribution target (S66). Details of the processing of S66 are similar to the processing described in FIG. 19. Here, the selected time is the past time prior to three minutes from the present time.

In the present embodiment, the time selection screen 654 is used to specify a further past time than the range specifiable by the user with an operation of the seek bar 670. Therefore, when the time is selected on the time selection screen 654, a configuration to omit the processing of the determiner 27 and to cause the distributor 28 to have only the compressed data attribute DB 906 as a search target may be employed.

The distributor 28 distributes the position image and the compressed captured data 905 of the selected time and the screen layout definition information (S67). The distributor 28 performs expansion processing when distributing the compressed captured data 905 to the client terminal 50. Alternatively, a configuration to cause the display controller 52 of the client terminal 50 to expand the compressed captured data 905 may be employed.

The communicator 51 of the client terminal 50 receives, from the image distribution server 20, the screen layout definition information, the position image, and the compressed captured data 905. The communicator 51 sends, to the display controller 52, the distributed screen layout definition information, the distributed position image, and the expanded compressed captured data 905.

The display controller 52 interprets the screen layout definition information distributed from the image distribution server 20 to generate the display screen, and displays the position image and the expanded compressed captured data 905 of the selected time, on the display 508 (S68).

Further, when the user performs an operation to select and click the close button 681 in the captured data reproduction area 660 with a mouse or the like, the acceptor 53 accepts the captured data distribution termination request. The acceptor 53 sends the captured data distribution termination request to the communicator 51. The communicator 51 transmits the captured data distribution termination request to the image distribution server 20 (S69). The request acceptor 25 of the image distribution server 20 sends an instruction of captured data distribution termination to the distributor 28. It is the compressed captured data 905 that is distributed at this point of time, and thus the distributor 28 terminates the distribution of the compressed captured data 905 (S70).

Further, when the user performs an operation to close the screen of the web browser or the like, the acceptor 53 accepts the image distribution termination request. The acceptor 53 sends the image distribution termination request to the communicator 51. The communicator 51 transmits the image distribution termination request to the image distribution server 20 (S71). The request acceptor 25 of the image distribution server 20 sends an instruction of image distribution termination to the distributor 28. It is the position image that is distributed at this point of time, and thus the distributor 28 terminates the distribution of the position image (S72). When the distribution of the position image is terminated, the distribution of the screen layout definition information including the information such as the seek bar 670 is also terminated.

In this way, according to the image distribution server 20 of the present embodiment, the compressor 24 compresses the captured data 903 of after elapse of a certain time from capturing by the imaging device 101 of the in-vehicle device 10 to generate the compressed captured data 905, and stores the compressed captured data 905. Therefore, even if a large amount of past captured data is stored, an increase in the storage capacity of the image distribution server 20 can be avoided. Meanwhile, the image distribution server 20 of the present embodiment does not compress and does store the captured data 903 until the certain time elapses from the capturing, and the distributor 28 distributes the captured data 903 before compression to the client terminal 50 when the desired time of the user is the past time within a certain time from the present time. Therefore, according to the image distribution server 20 of the present embodiment, when the user desires the captured data 903 of the past time within the certain time from the present time, expansion of the compressed captured data 905 is not necessary, and thus the captured data 903 can be reproduced on the client terminal 50 in real time. As a result, the user can grasp a traffic state such as occurrence of a jam in real time. In other words, according to the image distribution server 20 of the present embodiment, the storage capacity of the image distribution server 20 is reduced, and the user can grasp the traffic state in real time by distribution of the captured data 903 of the past time within a certain time from the present time.

Further, according to the image distribution server 20 of the present embodiment, the desired time of the user is accepted from the client terminal 50, the data captured by the imaging device 101 is received from the in-vehicle device 10, and the captured data 903 or the compressed captured data 905 converted into a streaming distributable format is distributed to the client terminal 50. Therefore, the user can inquire not only the captured data 903 captured by the imaging device 101 of the in-vehicle device 10 in real time but also the captured data 903 or the compressed captured data 905 of a desired past time.

Further, as described above, in the image distribution server 20 of the present embodiment, while the compressor 24 compresses the captured data 903 of after elapse of a certain time from capturing, the compressor 24 does not compress the captured data 903 until the certain time elapses from the capturing. Therefore, according to the image distribution server 20 of the present embodiment, the captured data 903 in the past within a certain time from the present time, which has high inquiry frequency from the user, can be promptly reproduced, and disk capacity of the image distribution server 20 and a network load can be decreased.

Therefore, according to the image distribution server 20 of the present embodiment, the past desired captured data can be promptly reproduced and convenience of the user can be improved while reduction of the storage capacity of the image distribution server 20 and a decrease in the network load can be achieved.

Further, according to the image distribution server 20 of the present embodiment, the captured data 903 or the compressed captured data 905 of not only when a specific event such as a traffic jam occurs but also the desired time of the user is distributable. Therefore, the captured data 903 or the compressed captured data 905 can be provided to the user without limiting its use.

Further, in the image distribution server 20 of the present embodiment, the distributor 28 determines which of the captured data 903 and the compressed captured data 905 is distributed to the client terminal 50, on the basis of the determination of the determiner 27. Therefore, according to the image distribution server 20 of the present embodiment, the user can make a request without being conscious of distribution of which of the captured data 903 and the compressed captured data 905 is requested, when making the captured data distribution request. Further, the determiner 27 performs the determination, and thus the search target data of the distributor 28 is limited to either the captured data 903 or the compressed captured data 905. Therefore, the processing load of the image distribution server 20 by the search can be reduced.

Further, in the image distribution server 20 of the present embodiment, the receiver 21 receives the data captured by the imaging device 101 of the in-vehicle device 10 mounted in the vehicle 150. Therefore, according to the image distribution server 20 of the present embodiment, the captured data can be obtained in a place where capturing is difficult by a fixed-point camera fixed and provided to a side of a road, and a blind spot of the fixed-point camera can be covered.

Further, in the image distribution server 20 of the present embodiment, the receiver receives the position information that indicates the position of the in-vehicle device 10 of each time, and the position image in which the icon 651 that indicates the position of the in-vehicle device 10 of a desired time of the user is displayed on the map data 900 is distributed. Therefore, according to the image distribution server 20 of the present embodiment, the user can inquire the position of the in-vehicle device 10 of the desired time. Further, according to the image distribution server 20 of the present embodiment, the user can easily find the vehicle 150 driving near a place that the user wishes to inquire at the desired time, from the position image.

Further, in the image distribution server 20 of the present embodiment, the distributor 28 distributes the captured data 903 or the compressed captured data 905 and the position image in a reproducible manner on the same screen. Therefore, according to the image distribution server 20 of the present embodiment, the user can easily confirm the position of the in-vehicle device 10 of the time when the captured data 903 or the compressed captured data 905 has been captured, when insuring the captured data 903 or the compressed captured data 905.

Further, in the image distribution server 20 of the present embodiment, the distributor 28 distributes the seek bar 670, the captured data 903 or the compressed captured data 905, and the position image in a reproducible manner on the same screen. Therefore, according to the image distribution server 20 of the present embodiment, the user can operate the seek bar 670 to easily specify the past arbitrary time while confirming the image of the position image and the captured data 903 or the compressed captured data 905.

For example, when the user misses the image during distribution of the captured data 903 of the present time, the user can promptly inquire the past captured data 903 with an operation of the seek bar 670 on the same screen.

Further, at this time, even if the past arbitrary time specified by the user is a further past time than a certain time, distribution of either the captured data 903 or the compressed captured data 905 to the client terminal 50 is determined by the determiner 27. Therefore, according to the image distribution server 20 of the present embodiment, the user can operate rewinding without being conscious of a boundary line between the captured data 903 and the compressed captured data 905.

Further, according to the image distribution server 20 of the present embodiment, the captured data converter 23 converts the captured data received by the receiver 21 from the in-vehicle device 10 into the streaming distributable format. Therefore, the network load of when the captured data 903 is distributed from the image distribution server 20 to the client terminal 50 is decreased, and the distribution can be promptly performed.

Further, according to the image distribution server 20 of the present embodiment, the distributor 28 changes the direction of the icon 651 that indicates the position of the in-vehicle device 10 on the position image in accordance with the traveling direction of the vehicle 150 identified from the position information by the calculator 26. Therefore, the user can easily grasp the traveling direction of the vehicle 150. Therefore, when the position image and the captured data 903 or the compressed captured data 905 are displayed on the same screen, the user can grasp which direction of the in-vehicle device 10 is displayed with the captured data 903 or the compressed captured data 905 by the imaging device 101.

Further, according to the image distribution server 20 of the present embodiment, the distributor 28 changes the color of the icon 651 that indicates the position of the in-vehicle device 10 according to the speed of the vehicle 150. Therefore, the user can get to know the speed of the vehicle 150 from the position image. For example, when the speed of the in-vehicle device 10 is slow, the user can read a possibility of a jam on the road where the vehicle 150 having the in-vehicle device 10 mounted therein drives, from the position image.

According to the image distribution server 20 of the present embodiment, the calculator 26 calculates the speed of the vehicle 150 from the position information. Therefore, even if the in-vehicle device 10 does not include a device that measures the speed, change of the color of the icon 651 according to the speed of the vehicle 150 can be performed.

Further, in the image distribution server 20 of the present embodiment, the distributor 28 accepts the user ID of the user who has logged in to the client terminal 50 from the client terminal 50, and distributes the captured data 903 or the compressed captured data 905 including the user in the open range. Further, in the image distribution server 20 of the present embodiment, the distributor 28 does not distribute the captured data 903 or the compressed captured data 905 not including the user in the open range, and the position image. According to the image distribution server 20 of the present embodiment, access control by the authority of the user is set in this way, whereby the captured data and the position information captured and acquired by the in-vehicle devices 10 mounted in the vehicles 150 owned by different companies can be mutually used in an appropriate range.

That is, one user can use the captured data and the position information captured and acquired by a plurality of the in-vehicle device 10. Therefore, time and place in a monitoring range can be expanded when a security company or the like uses the image distribution server 20 of the present embodiment. Further, the positions of a plurality of the in-vehicle devices 10 of which the user has authority to make an inquiry are displayed on the position image. Therefore, according to the image distribution server 20 of the present embodiment, grasp of the positions of the plurality of in-vehicle devices 10 and control of the information can be intensively performed.

Note that, in the image distribution system 1 of the present embodiment, the configuration to cause the calculator 26 of the image distribution server 20 to calculate the speed of the vehicle 150 from the position information has been employed. However, a configuration to cause the in-vehicle device 10 to acquire the speed of the vehicle 150 and transmit the speed to the image distribution server 20 may be employed. For example, a configuration to cause the in-vehicle device 10 to acquire the speed of the vehicle 150 from a wheel speed sensor of the vehicle 150 may be employed. Alternatively, a configuration to cause the in-vehicle device 10 to detect acceleration of the vehicle 150 may be employed. When this configuration is employed, the processing of calculating the speed of the vehicle 150 by the calculator 26 can be omitted, and the processing load of the image distribution server 20 can be decreased.

The configuration to cause the image distribution server 20 of the present embodiment to distribute the captured data 903 and the position information to the client terminal 50 after storing the captured data 903 and the position information to the HDD 204 has been employed. However, an embodiment is not limited thereto. For example, a configuration to distribute the captured data 903 converted for streaming distribution and the position image to the client terminal 50 as needed without storing the captured data 903 and the position information to the HDD 204 may be employed.

In the image distribution server 20 of the present embodiment, the configuration to accept specification of the time of the user at the position display request has been employed. However, a display target region may be made specifiable. Further, the display target region may be made specifiable by input of a name of a place by the user with the search button 680 on the screen during distribution of the position image.

Further, in the image distribution server 20 of the present embodiment, the vehicle ID is identified by accepting of the operation to click the icon 651 on the screen by the user at the captured data display request. However, the vehicle ID may be made identifiable by input of the vehicle ID by the user with the search button 680 on the screen.

The imaging device 101 of the in-vehicle device 10 of the present embodiment captures the moving image. However, an embodiment is not limited thereto, and a configuration to capture a still image may be employed.

Further, the configuration to cause the distributor 28 of the image distribution server 20 to distribute the captured data 903 of a moving image as it is in streaming distribution has been employed. However, an embodiment is not limited thereto, and a configuration to generate still images from frames that configure a moving image and distribute the successive still images to the client terminal 50 with frame advance may be employed. Further, the distributor 28 of the image distribution server 20 may employ progressive download to download data to the memory of the client terminal 50 in distribution to the client terminal 50.

Second Embodiment

While the image distribution system 1 of the first embodiment has performed the processing such as generation of the screen layout definition information, identification of the traveling direction and calculation of the speed of the vehicle 150, and generation of the position image on the image distribution server 20 side, such processing is performed on a client terminal 50 side in the present embodiment.

A hardware configuration and a functional configuration of an in-vehicle device 10 in the present embodiment are similar to those of the first embodiment. Further, hardware configurations of an image distribution server 20 and the client terminal 50 in the present embodiment are similar to those of the first embodiment.

A functional configuration of the image distribution server 20 in the present embodiment will be described.

Figure 21:
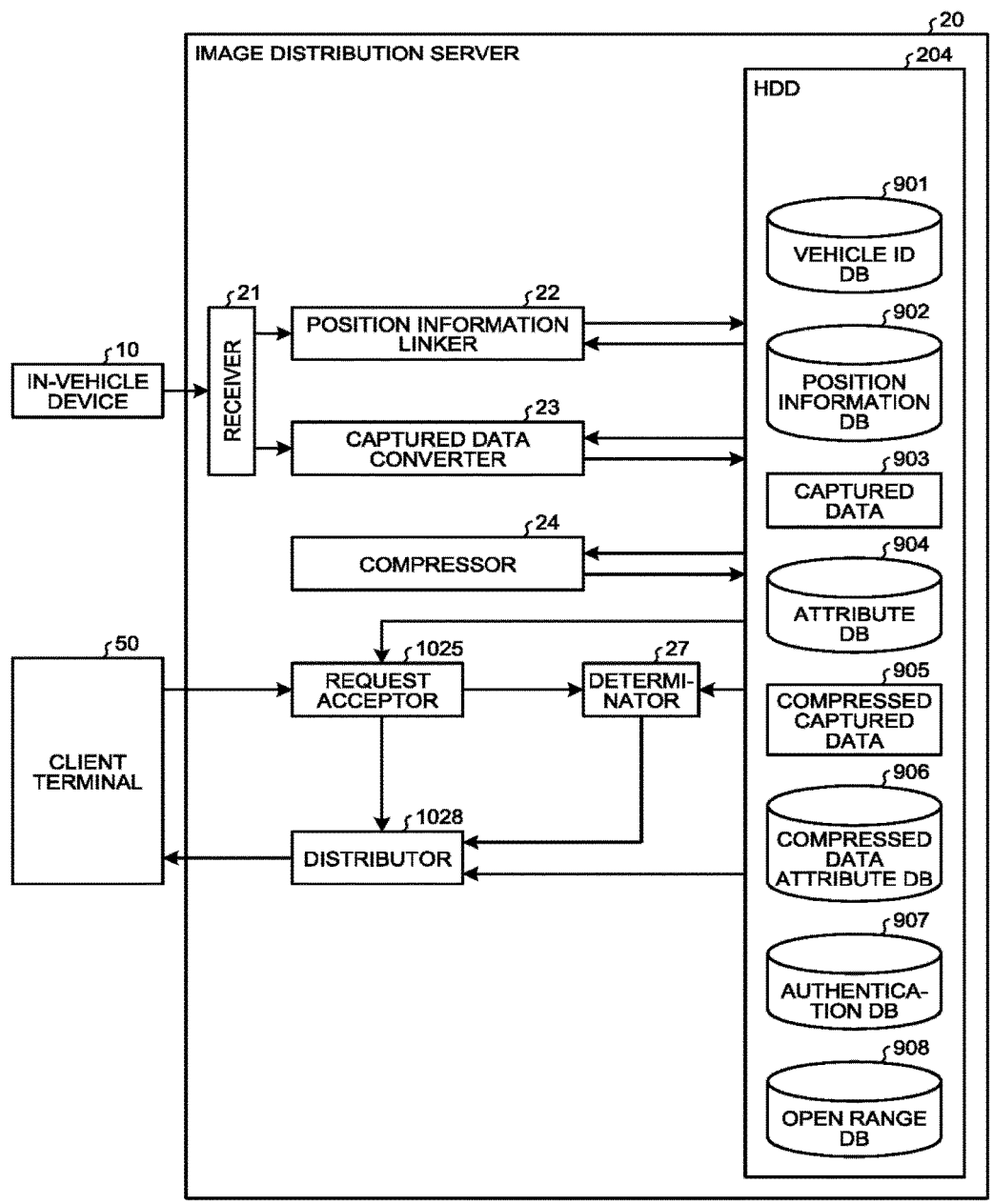
FIG. 21 is a block diagram illustrating an example of a functional configuration of an image distribution server according to a second embodiment.

FIG. 21 is a block diagram illustrating an example of a functional configuration of the image distribution server 20 in the present embodiment. As illustrated in FIG. 21, the image distribution server 20 includes a receiver 21, a position information linker 22, a captured data converter 23, a compressor 24, a request acceptor 1025, a determiner 27, and a distributor 1028.

Further, an HDD 204 stores a vehicle ID DB 901, a position information DB 902, captured data 903, an attribute DB 904, compressed captured data 905, a compressed data attribute DB 906, an authentication DB 907, and an open range DB 908.

Configurations of the receiver 21, the position information linker 22, the captured data converter 23, the compressor 24, and the determiner 27 are similar to those of the first embodiment described in FIG. 5. Further, the databases and data stored in the HDD 204 are similar to those in the first embodiment.

The request acceptor 1025 accepts, from the client terminal 50, requests such as a position display request, a captured data display request, a pause request, a rewinding request, a fast-forwarding request, selection of a display target time, a captured data distribution termination request, and an image distribution termination request, of a user, similarly to the first embodiment.

To be specific, when accepting the position display request from the client terminal 50, the request acceptor 1025 of the present embodiment sends a vehicle ID found from the open range DB 908 and a desired time of the user to the distributor 1028.

Further, when accepting the captured data display request from the client terminal 50, the request acceptor 1025 sends the desired time of the user and the vehicle ID to the distributor 1028. Further, the request acceptor 1025 sends the desired time of the user to the determiner 27.

Further, when accepting the pause request from the client terminal 50, the request acceptor 1025 sends, to the distributor 1028, an instruction of pause of position information and the captured data 903 or the compressed captured data 905 in distribution.

Further, when accepting the rewinding request or the fast-forwarding request from the client terminal 50, the request acceptor 1025 sends, to the distributor 1028, a past arbitrary time specified by the user and the vehicle ID including the user in an open range. Further, when accepting the rewinding request or the fast-forwarding request during distribution of the captured data 903 or the compressed captured data 905, the request acceptor 1025 further sends, to the distributor 1028, the vehicle ID of the captured data 903 or the compressed captured data 905 in distribution. Further, the request acceptor 1025 sends the past arbitrary time specified by the user to the determiner 27.

Further, in the present embodiment, display of a time selection screen 654 is performed on the client terminal 50 side, and the display target time selected by the user on the time selection screen 654 is transmitted from the client terminal 50 to the image distribution server 20. When accepting the selection of the display target time, the request acceptor 1025 sends the time selected by the user and the vehicle ID including the user in the open range to the distributor 1028. Further, the request acceptor 1025 sends the time selected by the user to the determiner 27.

Further, when accepting the captured data distribution termination request from the client terminal 50, the request acceptor 1025 sends an instruction of captured data distribution termination to the distributor 1028. Further, when accepting the image distribution termination request from the client terminal 50, the request acceptor 1025 sends an instruction of image distribution termination to the distributor 1028.

In the present embodiment, generation of a position image is performed on the client terminal 50 side, and thus the distributor 1028 distributes the position information, instead of the position image, to the client terminal 50. Further, the distributor 1028 distributes the captured data 903 or the compressed captured data 905 to the client terminal 50, similarly to the first embodiment.

To be specific, when the request acceptor 1025 accepts the position display request, the distributor 1028 acquires the vehicle ID of an open target and the desired time of the user from the request acceptor 1025. The distributor 1028 searches the position information DB 902 for the position information of the in-vehicle device 10 associated with the vehicle ID of the open target and the desired time of the user.

Further, the distributor 1028 searches the position information DB 902 for the position information of the in-vehicle device 10 of a time immediately before the desired time of the user. The distributor 1028 distributes, to the client terminal 50, the found desired time of the user and the found position information of the time immediately before the desired time of the user in association with the vehicle ID and the time. The position information is used to identify a traveling direction and calculate a speed of a vehicle 150, in the client terminal 50 described below.

The distributor 1028 similarly distributes the time selected and the like by the user, and the position information of a time immediately before the time to the client terminal 50 in association with the vehicle ID and the time, when the request acceptor 1025 accepts the captured data display request, the rewinding request, the fast-forwarding request, and the selection of the display target time.

Further, when accepting the instruction of captured data distribution termination from the request acceptor 1025, the distributor 1028 terminates distribution of the captured data 903 or the compressed captured data 905 in distribution. When accepting the instruction of image distribution termination request from the request acceptor 1025, the distributor 1028 terminates distribution of the position information and the captured data 903 or the compressed captured data 905 in distribution.

Next, a functional configuration of the client terminal 50 in the present embodiment will be described.

Figure 22:
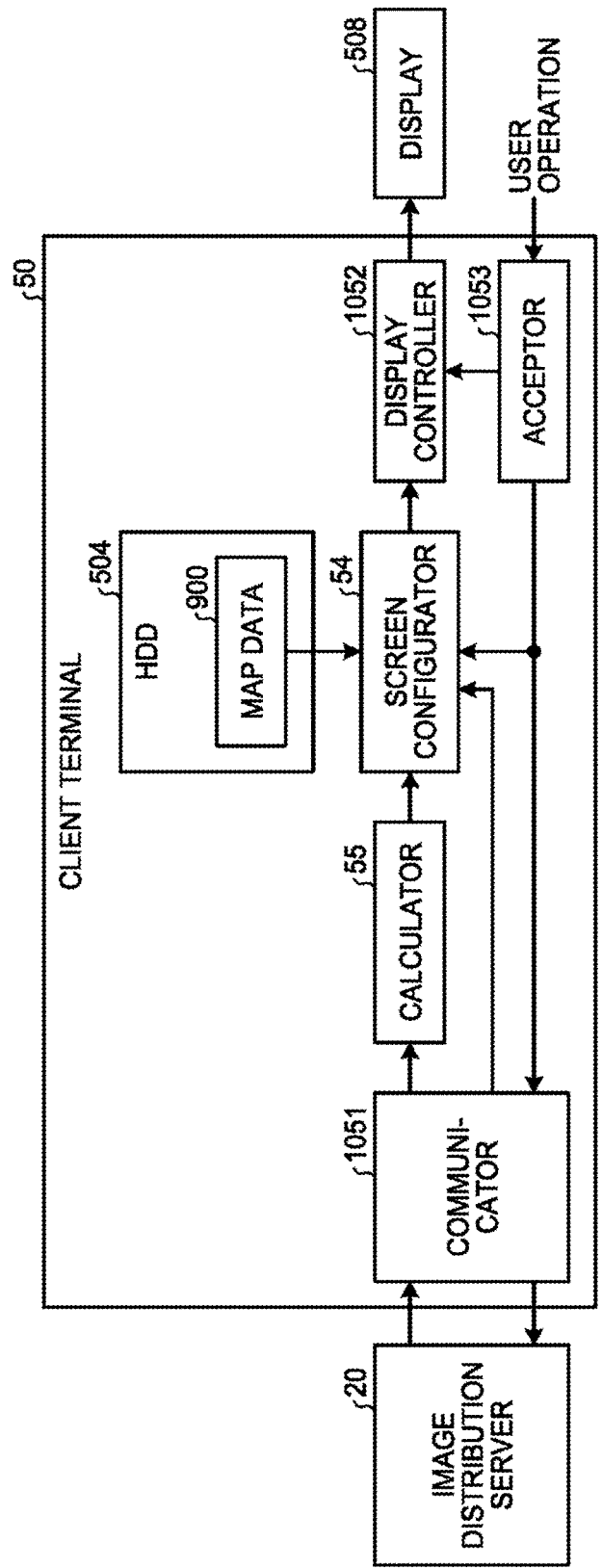
FIG. 22 is a block diagram illustrating an example of a functional configuration of a client terminal in the second embodiment.

FIG. 22 is a block diagram illustrating an example of a functional configuration of the client terminal 50 in the present embodiment. As illustrated in FIG. 22, the client terminal 50 includes a communicator 1051, a calculator 55, a screen controller 54, a display controller 1052, and an acceptor 1053. Further, an HDD 504 stores map data 900.

The communicator 1051 receives distribution from the image distribution server 20. To be specific, the communicator 1051 receives, from the image distribution server 20, the position information and the captured data 903 or the compressed captured data 905 associated with the vehicle ID and the time. When receiving the distribution from the image distribution server 20, the communicator 1051 sends the position information associated with the vehicle ID and the time to the calculator 55 and the screen controller 54. Further, the communicator 1051 sends the distributed captured data 903 or the distributed compressed captured data 905 to the screen controller 54.

Further, when the acceptor 1053 accepts the request from the user, the communicator 1051 acquires the request from the user accepted by the acceptor 1053, a user ID of the user, the desired time, and the like, and transmits the acquired information to the image distribution server 20.

The calculator 55 identifies the traveling direction of the vehicle 150 from the position of the in-vehicle device 10 of a specific time, and the position of the in-vehicle device 10 of a time immediately before the specific time, and calculates the speed. To be specific, when the specific time is a time selected or the like by the user, the calculator 55 acquires, from the communicator 1051, the position information associated with the vehicle ID and the time selected or the like by the user, and the time immediately before the time.

The calculator 55 identifies the traveling direction of the vehicle 150 corresponding to the acquired vehicle ID, from change of the position of the in-vehicle device 10 from the time immediately before the time selected or the like by the user to the time selected or the like by the user. Further, the calculator 55 calculates the speed of the vehicle 150, from a moving distance of the in-vehicle device 10 from the time immediately before the time selected or the like by the user to the time selected or the like by the user, and the time from the time immediately before the time selected or the like by the user to the time selected or the like by the user. The calculator 55 sends the identified traveling direction and the calculated speed of the vehicle 150 to the screen controller 54 in association with the vehicle ID and the time. The calculator 55 of the present embodiment can also be referred to as an identifier. The technique to identify the traveling direction of the vehicle 150 is not limited to the calculation.

The screen controller 54 generates screen layout definition information for enabling the captured data 903 or the compressed captured data 905 acquired from the communicator 1051 to be reproduced on the same screen as the position image. To be specific, the screen controller 54 acquires, from the communicator 1051, the position information associated with the vehicle ID and the time distributed by the image distribution server 20, and the distributed captured data 903 or the distributed compressed captured data 905. The screen controller 54 maps the map data 900, and the position information of each of the in-vehicle devices 10 associated with the vehicle IDs and the time. The screen controller 54 then generates a position image in which an icon 651 that indicates the position of the in-vehicle device 10 of the desired time of the user is displayed on the map data 900.

Further, the screen controller 54 acquires the traveling direction and the speed of the vehicle 150 from the calculator 55. The screen controller 54 changes the direction of the icon 651 that indicates the position of the in-vehicle device 10 on the position image in accordance with the traveling direction of the vehicle 150. Further, the screen controller 54 changes definition of a display form of an icon in the screen layout definition information according to the speed of the vehicle 150, thereby to change the display form, i.e., the color, of the icon 651 that indicates the position of the in-vehicle device 10 on the position image.

The screen controller 54 defines a screen layout to arrange the position image, the captured data 903 or the compressed captured data 905, a seek bar 670, and the like on the screen by HTML. The screen controller 54 sends, to the display controller 1052, the screen layout definition information, the position image, and the captured data 903 or the compressed captured data 905.

Further, the screen controller 54 generates the time selection screen 654 when receiving an instruction of display of the time selection screen 654 from the acceptor 1053. The time selection screen 654 may be a similar screen to the screen of the first embodiment described in FIG. 12, or may employ another display form. The screen controller 54 sends the generated time selection screen 654 to the display controller 1052.

The display controller 1052 interprets the screen layout definition information acquired from the screen controller 54 to form the display screen, and displays a screen including an position image reproduction area 650, a captured data reproduction area 660, the seek bar 670, a selection screen display button 653, and a search button 680, on a display 508, like the screen image illustrated in FIG. 11. Further, when accepting the pause request from the acceptor 1053, the display controller 1052 stops the position image and the captured data 903 or the compressed captured data 905 on the screen while remaining displaying the pause request in a state of when accepted.

Similarly to the first embodiment, the acceptor 1053 accepts operations to make various requests, which have been performed by the user to the client terminal 50. For example, the acceptor 1053 accepts the requests such as the position display request, the captured data display request, the pause request, the rewinding request, the fast-forwarding request, the display request of the time selection screen, and the selection of the display target time, of the user.

When accepting the position display request, the acceptor 1053 sends, to the communicator 1051, the position display request, the user ID of the user who has logged in, and the desired time of the user or the present time.

Further, when accepting the captured data display request, the acceptor 1053 sends, to the communicator 1051, the captured data display request, the desired time of the user, and the vehicle ID specified by the user.

Further, when accepting the pause request, the acceptor 1053 sends the pause request to the display controller 1052 and the communicator 1051. When accepting the rewinding request or the fast-forwarding request, the acceptor 1053 sends, to the communicator 1051, the rewinding request or the fast-forwarding request, and an arbitrary time specified by the user with a pointer 671. Further, when accepting the rewinding request or the fast-forwarding request during distribution of the captured data 903 or the compressed captured data 905, the acceptor 1053 sends, to the communicator 1051, the vehicle ID of the captured data 903 or the compressed captured data 905 in distribution, in addition to the arbitrary time specified by the user with the pointer 671.

When accepting the display request of the time selection screen, the acceptor 1053 sends an instruction of display of the time selection screen to the screen controller 54. When accepting the selection of the display target time during display of the time selection screen 654, the acceptor 1053 sends the time selected by the user to the communicator 1051.

A flow of capturing processing by the in-vehicle device 10 of the present embodiment configured as described above is similar to that of the first embodiment described with the flowchart of FIG. 15. Further, processing in which the image distribution server 20 receives the captured data and the like transmitted by the in-vehicle device 10, and converts and stores the received data and the like is also similar to that of the first embodiment described with the flowchart of FIG. 16. Further, a flow of processing of compressing the captured data 903 by the image distribution server 20 of the present embodiment is also similar to that of the first embodiment described with the flowchart of FIG. 17.

Next, processing of distributing an image by the image distribution server 20 of the present embodiment will be described.

Figure 23:
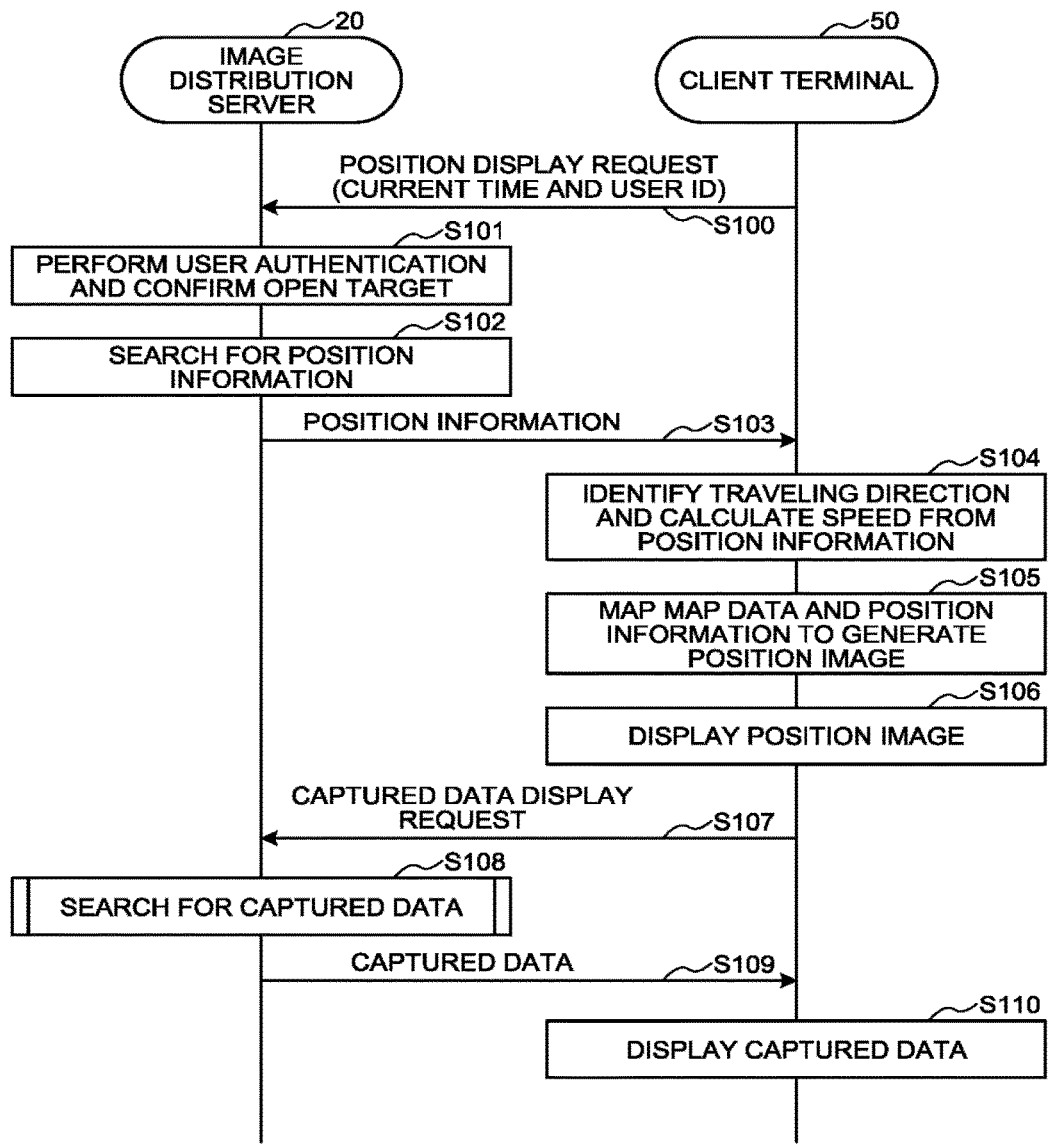
FIG. 23 is a sequence diagram illustrating an example of a flow of processing of distributing an image in the second embodiment.

FIG. 23 is a sequence diagram illustrating an example of a flow of processing of distributing an image in the present embodiment. Transmission of the position display request in S100 and confirmation of user authentication and an open target in S101 are similar to those in S30 and S31 described in FIG. 18.

The distributor 1028 searches the position information DB 902 for the position information of the present time, of the in-vehicle device 10 associated with the vehicle ID acquired from the request acceptor 1025, and the position information of the in-vehicle device 10 of a time immediately before the present time (S102).

The distributor 1028 distributes, to the client terminal 50, the position information of the present time and the time immediately before the present time in association with the vehicle ID and the time through a network (S103). The communicator 1051 of the client terminal 50 receives the position information associated with the vehicle ID and the time from the image distribution server 20. The communicator 1051 sends the position information associated with the vehicle ID and the time to the calculator 55 and the screen controller 54.

The calculator 55 identifies the traveling direction of the vehicle 150, from change of the position of the in-vehicle device 10 from the time immediately before the present time to the present time. Further, the calculator 55 calculates the speed of the vehicle 150, from the moving distance of the in-vehicle device 10 from the time immediately before the present time to the present time, and the time from the time immediately before the present time to the present time (S104). The calculator 55 sends the identified traveling direction and the calculated speed of the vehicle 150 to the screen controller 54 in association with the vehicle ID and the time.

The screen controller 54 maps the map data 900 and the position information of each of the in-vehicle devices 10 acquired from the communicator 1051. The screen controller 54 then generates the position image in which the icon 651 that indicates the position of the in-vehicle device 10 of the present time is displayed on the map data 900 (S105). Further, the screen controller 54 acquires, from the calculator 55, the traveling direction and the speed of the vehicle 150 associated with the vehicle ID and the time. The screen controller 54 generates the screen layout definition information, causing the direction of the icon 651 that indicates the position of the in-vehicle device 10 on the position image to be the same direction as the traveling direction of the vehicle 150. Further, the screen controller 54 changes the definition of the color of the icon 651 that indicates the position of the in-vehicle device 10 on the position image, in the screen layout definition information, according to the speed of the vehicle 150.

Further, the screen controller 54 defines the screen layout to arrange the position image, the seek bar 670, and the like on the screen by HTML. The screen controller 54 sends the screen layout definition information and the position image to the display controller 1052.

The display controller 1052 interprets the screen layout definition information acquired from the screen controller 54 to form the display screen, and displays the position image on the display 508 (S106).

When accepting the captured data display request of the user, the acceptor 1053 sends, to the communicator 1051, the captured data display request, the desired time of the user, and the vehicle ID specified by the user. The communicator 1051 sends, to the image distribution server 20, the captured data display request, the desired time of the user, and the vehicle ID specified by the user (S107).

Captured data search processing of S108 is similar to the processing of S38 described in FIG. 18. Further, details of the captured data search processing of S108 are similar to the processing of the flowchart of FIG. 19.

The distributor 1028 reads the captured data 903 or the compressed captured data 905 of a distribution target identified in the processing of S108 from the HDD 204, and distributes the read data to the client terminal 50 (S109).

The communicator 1051 of the client terminal 50 receives the captured data 903 from the image distribution server 20. The communicator 1051 sends the distributed captured data 903 to the screen controller 54. The screen controller 54 defines the screen layout to arrange the captured data 903 or the compressed captured data 905 on the screen by HTML. The screen controller 54 sends the screen layout definition information, and the captured data 903 or the compressed captured data 905 to the display controller 1052.

The display controller 1052 interprets the screen layout definition information acquired from the screen controller 54 to form the display screen, and displays the captured data 903 or the compressed captured data 905 on the display 508 (S110).

Next, various types of request processing in the present embodiment will be described.

FIG. 24 is a sequence diagram illustrating an example of a flow of various types of request processing in the present embodiment. The position image and the captured data 903 are displayed on the display 508 on the assumption of the processing of FIG. 24.

When accepting the pause request, the acceptor 1053 sends the pause request to the communicator 1051 and the display controller 1052. The communicator 1051 transmits the pause request to the image distribution server 20. The communicator 1051 transmits the pause request to the image distribution server 20 (S120).

The request acceptor 1025 of the image distribution server 20 accepts the pause request from the client terminal 50. The request acceptor 1025 sends an instruction of pause of the position information and the captured data 903 to the distributor 1028. The distributor 1028 stops distribution of the position information and the captured data 903 (S121). Further, the display controller 1052 stops display of the position image and the captured data 903 on the screen while remaining displaying the pause request in a state of when accepted (S122).

Further, when accepting the rewinding request, the acceptor 1053 sends, to the communicator 1051, the rewinding request, the past arbitrary time specified by the user with the pointer 671, and the vehicle ID of the captured data 903 in distribution. The communicator 1051 transmits, to the image distribution server 20, the rewinding request, the past arbitrary time specified by the user with the pointer 671, and the vehicle ID of the captured data 903 in distribution (S123).

The request acceptor 1025 of the image distribution server 20 accepts, from the client terminal 50, the rewinding request, the past arbitrary time specified by the user with the pointer 671, and the vehicle ID of the captured data 903 in distribution. The request acceptor 1025 sends, to the distributor 1028, the past arbitrary time specified by the user and the vehicle ID including the user in the open range. The request acceptor 1025 further sends, to the distributor 1028, the past arbitrary time specified by the user and the vehicle ID of the captured data 903 in distribution. Further, the request acceptor 1025 sends the past arbitrary time specified by the user to the determiner 27.

The distributor 1028 searches the position information DB 902 for the position information of a specified time, of the in-vehicle device 10 associated with the vehicle ID acquired from the request acceptor 1025, and the position information of the in-vehicle device 10 of the time immediately before the specified time (S124).

The determiner 27 determines whether the specified past arbitrary time is a past time within three minutes from the present time or a past time prior to three minutes, and sends the determination result to the distributor 1028. The distributor 1028 searches either the attribute DB 904 or the compressed data attribute DB 906 according to the determination of the determiner 27 and identifies the captured data 903 or the compressed captured data 905 as the distribution target (S125). Details of processing of S125 are similar to the processing described in FIG. 19. Here, the specified past arbitrary time is the past time within three minutes from the present time.

The distributor 1028 distributes, to the client terminal 50, the position information of the in-vehicle device 10 of the specified time and the position information of the in-vehicle device 10 of the time immediately before the specified time in association with the vehicle ID and the time. Further, the distributor 1028 distributes the identified captured data 903 to the client terminal 50 (S126).

The communicator 1051 of the client terminal 50 receives, from the image distribution server 20, the position information associated with the vehicle ID and the time, and the captured data 903. The communicator 1051 sends the position information associated with the vehicle ID and the time to the calculator 55 and the screen controller 54. Further, the communicator 1051 sends the distributed captured data 903 to the screen controller 54.

The calculator 55 identifies the traveling direction of the vehicle 150, from change of the position of the in-vehicle device 10 from the time immediately before the specified time to the specified time. Further, the calculator 55 calculates the speed of the vehicle 150, from the moving distance of the in-vehicle device 10 from the time immediately before the specified time to the specified time, and the time from the time immediately before the specified time to the specified time (S127). The calculator 55 sends the identified traveling direction and the calculated speed of the vehicle 150 to the screen controller 54 in association with the vehicle ID and the time.

The screen controller 54 acquires, from the calculator 55, the traveling direction and the speed of the vehicle 150 associated with the vehicle ID and the time. The screen controller 54 maps the icon 651 that indicates the position of the vehicle 150 of the specified time with the map data 900 to generate the position image (S128). Further, the screen controller 54 generates the screen layout definition information in which the position and the color of the icon 651 on the position image are changed according to the traveling direction and the speed of the vehicle 150. The screen controller 54 sends the screen layout definition information, the position image, and the captured data 903 to the display controller 1052.

The display controller 1052 interprets the screen layout definition information acquired from the screen controller 54 to form the display screen, and displays the position image and the captured data 903 of the specified time, on the display 508 (S129).

When accepting the display request of the time selection screen, the acceptor 1053 sends the display request of the time selection screen to the screen controller 54. When receiving an instruction of display of the time selection screen 654 from the acceptor 1053, the screen controller 54 generates the time selection screen 654. The screen controller 54 sends the generated time selection screen 654 to the display controller 1052. The display controller 1052 displays the time selection screen 654 on the display 508 (S130).

When accepting the selection of the display target time, the acceptor 1053 sends the time selected by the user to the communicator 1051. The communicator 1051 transmits the time selected by the user to the image distribution server 20 (S131).

When accepting the selection of the display target time, the request acceptor 1025 of the image distribution server 20 sends the time selected by the user and the vehicle ID including the user in the open range to the distributor 1028. Further, the request acceptor 1025 sends the time selected by the user to the determiner 27.

The distributor 1028 searches the position information DB 902 for the position information of the in-vehicle device 10 of the selected time associated with the vehicle ID acquired from the request acceptor 1025, and the position information of the in-vehicle device 10 of the time immediately before the selected time (S132).

The determiner 27 determines whether the selected time is the past time within three minutes from the present time or the past time prior to three minutes, and sends the determination result to the distributor 1028. The distributor 1028 searches either the attribute DB 904 or the compressed data attribute DB 906 according to the determination of the determiner 27 and identifies the captured data 903 or the compressed captured data 905 as the distribution target (S133). Details of processing of S133 are similar to the processing described in FIG. 19. Here, the selected time is the past time prior to three minutes from the present time.

The distributor 1028 distributes, to the client terminal 50, the position information of the in-vehicle device 10 of the selected time and the position information of the in-vehicle device 10 of the time immediately before the selected time in association with the vehicle ID and the time. Further, the distributor 1028 distributes the identified compressed captured data 905 to the client terminal 50 (S134).

Similarly to S127, the calculator 55 identifies the traveling direction of the vehicle 150 of the selected time and calculates the speed (S135). Further, the screen controller 54 generates maps the icon 651 that indicates the position of the vehicle 150 of the selected time with the map data 900 to generate the position image (S136). Further, the screen controller 54 generates the screen layout definition information in which the position and the color of the icon 651 on the position image are changed according to the traveling direction and the speed of the vehicle 150. The screen controller 54 sends the screen layout definition information, the position image, and the compressed captured data 905 to the display controller 1052.

The display controller 1052 interprets the screen layout definition information acquired from the screen controller 54 to generate the display screen, and displays the position image and the expanded compressed captured data 905 of the selected time, on the display 508 (S137).

Processing from the captured data distribution termination request of S138 to the image distribution termination of S141 is similar to the processing of S69 to S72 of FIG. 20.

As described above, according to the image distribution system 1 of the present embodiment, effects similar to those of the first embodiment can be exhibited, and the processing such as generation of an image is performed on the client terminal 50 side, whereby a processing load of the image distribution server 20 can be reduced. Further, the processing such as generation of a screen and the like is performed in the client terminal 50. Therefore, a data amount transmitted/received between the client terminal 50 and the image distribution server 20 can be decreased, and a network load can be further decreased.

Note that the present embodiment has employed the configuration to cause the HDD 504 of the client terminal 50 to store the map data 900. However, a configuration to cause the client terminal 50 to receive distribution of the map data 900 from the image distribution server 20 may be employed. Further, a configuration to cause the client terminal 50 to acquire the map data 900 from an external system through the Internet or the like may be employed.

As described above, according to the image distribution server 20 of the first or second embodiment, the captured data can be distributed in real time and the user can grasp the state in real time while reduction of storage capacity is achieved. Further, according to the image distribution system 1 of the first or second embodiment, the captured data 903 or the compressed captured data 905 captured by the imaging device 101 of the in-vehicle device 10 of a desired time by the user can be distributed to the client terminal 50.

An image processing program executed in the in-vehicle device 10 of the first or second embodiment is recorded in a computer-readable recording medium such as a CD-ROM, a flexible disk (FD), a CD-R, or a digital versatile disk (DVD) in a file in an installable format or an executable format and provided.

Further, the capturing processing program executed in the in-vehicle device 10 of the first or second embodiment may be stored on a computer connected to the network such as the Internet, and provided by being downloaded through the network. Further, the capturing processing program executed in the in-vehicle device 10 of the first or second embodiment may be provided or distributed through the network such as the Internet.

Further, the capturing processing program executed in the in-vehicle device 10 of the first or second embodiment may be incorporated in a ROM or the like and provided.

The capturing processing program executed in the in-vehicle device 10 of the first or second embodiment has a module configuration including the above-described units (the captured data acquirer, the captured data converter, the time information acquirer, the position information acquirer, and the transmitter). As actual hardware, when the CPU (processor) reads the capturing processing program from the storage medium and executes the program, the above-described units are loaded on the main storage device, and the captured data acquirer, the captured data converter, the time information acquirer, the position information acquirer, and the transmitter are generated on the main storage device.

Further, a data receiving and storage processing program, a captured data compression processing program, an image distribution processing program, and a various types of request processing program executed in the image distribution server 20 of the above-described first or second embodiment are recorded in a computer-readable recording medium such as a CD-ROM, a flexible disk, a CD-R, or a DVD in a file in an installable format or an executable format.

Further, the data receiving and storage processing program, the captured data compression processing program, the image distribution processing program, and the various types of request processing program executed in the image distribution server 20 of the above-described first or second embodiment may be stored on a computer connected to the network such as the Internet, and provided by being downloaded through the network. Further, the data receiving and storage processing program, the captured data compression processing program, the image distribution processing program, and the various types of request processing program executed in the image distribution server 20 of the above-described first or second embodiment may be provided or distributed through the network such as the Internet.

Further, the data receiving and storage processing program, the captured data compression processing program, the image distribution processing program, and the various types of request processing program executed in the image distribution server 20 of the above-described first or second embodiment may be incorporated in a ROM or the like in advance and provided.

The data receiving and storage processing program, the captured data compression processing program, the image distribution processing program, and the various types of request processing program executed in the image distribution server 20 of the above-described first or second embodiment has a module configuration including the above-described units (the receiver, the position information linker, the captured data converter, the compressor, the request acceptor, the calculator, the determiner, and the distributor). As actual hardware, when the CPU (processor) reads the programs from the storage medium and executes the programs, the above-described units are loaded on the main storage device, and the receiver, the position information linker, the captured data converter, the compressor, the request acceptor, the calculator, the determiner, and the distributor are generated on the main storage device.

Further, an image receiving processing program and the various types of request processing program executed in the client terminal 50 of the first or second embodiment are recorded in a computer-readable recording medium such as a CD-ROM, a flexible disk, a CD-R, or a DVD in a file in an installable format or an executable format and provided.

Further, the image receiving processing program and the various types of request processing program executed in the client terminal 50 of the first or second embodiment may be stored on a computer connected to the network such as the Internet, and provided by being downloaded through the network. Further, the image receiving processing program and the various types of request processing program executed in the client terminal 50 of the first or second embodiment may be provided and distributed through the network such as the Internet.

Further, the image receiving processing program and the various types of request processing program executed in the client terminal 50 of the first or second embodiment may be incorporated in a ROM or the like in advance and provided.

The image receiving processing program and the various types of request processing program executed in the client terminal 50 of the first or second embodiment has a module configuration including the above-described units (the communicator, the calculator, the screen controller, the display controller, and the acceptor). As actual hardware, when the CPU (processor) reads the programs from the storage medium and executes the programs, the above-described units are loaded on the main storage device, and the communicator, the calculator, the screen controller, the display controller, and the acceptor are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image distribution device comprising:
   a receiver that receives data captured by an imaging device of an in-vehicle device mounted in a vehicle;
   a compressor that compresses the captured data after an elapse of a certain time from capturing by the imaging device to generate compressed captured data;
   a request acceptor that accepts a distribution request to specify a desired time from an information processing device;
   a determiner that determines whether the desired time is a past time within the certain time from a present time; and
   a distributor that distributes, when the desired time is the past time within the certain time from a present time, the captured data to the information processing device, and distributes, when the desired time is a past time prior to the certain time, the compressed captured data to the information processing device.

2. The image distribution device according to claim 1, wherein
   the receiver further receives position information indicating a position of the in-vehicle device of each time, and
   the distributor distributes a position image in which an icon indicating the position of the in-vehicle device of the time is displayed on map data.

3. The image distribution device according to claim 2, wherein
   the distributor distributes the captured data or the compressed captured data on a same screen as the position image in a reproducible manner.

4. The image distribution device according to claim 3, wherein
   the distributor distributes, in a reproducible manner on the same screen, operation information that enables a user to instruct rewinding of the captured data or the compressed captured data, and the position image, to a past arbitrary time,
   the request acceptor accepts the instruction of rewinding by a user,
   the determiner determines whether the past arbitrary time specified by the instruction of rewinding by the user is the past time within the certain time from a present time, and
   the distributor further distributes, when the past arbitrary time is the past time within the certain time from a present time, the captured data to the information processing device, and further distributes, when the past arbitrary time is the past time prior to the certain time, the compressed captured data to the information processing device.

5. The image distribution device according to claim 2, further comprising:
a converter that converts the captured data received by the receiver into a streaming distributable format.

6. The image distribution device according to claim 2, further comprising:
an identifier that identifies a traveling direction of the vehicle of a specific time, from the position of the in-vehicle device of the position information of the specific time, and the position of the in-vehicle device of the position information of a time immediately before the specific time, wherein
the distributor changes a direction of the icon on the position image in accordance with the traveling direction of the vehicle.

7. The image distribution device according to claim 2, wherein
the distributor changes a display form of the icon according to a speed of the vehicle.

8. The image distribution device according to claim 7, further comprising:
a calculator that calculates the speed of the vehicle of a specific time, from the position of the in-vehicle device of the position information of the specific time, and the position of the in-vehicle device of the position information of a time immediately before the specific time.

9. The image distribution device according to claim 7, wherein
the receiver receives the speed of the vehicle from the in-vehicle device.

10. The image distribution device according to claim 2, wherein
the request acceptor accepts identification information of a user who has logged in to the information processing device from the information processing device, and
the distributor distributes the captured data or the compressed captured data, and the position image to the information processing device to which the user has logged in, the user having authority of the captured data or the compressed captured data and the position image.

11. The image distribution device according to claim 2, wherein
the request acceptor accepts identification information of a user who has logged in to the information processing device from the information processing device, and
the distributor does not distribute the captured data or the compressed captured data, and the position image, to the information processing device to which the user has logged in, the user does not have authority of the captured data or the compressed captured data and the position image.

12. An image distribution system including a computer program product and an image distribution device, the computer program product including programmed instructions embodied in and stored on a non-transitory computer readable medium, wherein the instructions, when executed by a computer, cause the computer to perform:
transmitting data captured by an imaging device of an in-vehicle device, and position information indicating a position of the in-vehicle device of each time, to the image distribution device, and
the image distribution device comprising:
a receiver that receives the data captured by the imaging device of the in-vehicle device mounted in a vehicle;
a compressor that compresses the captured data after an elapse of a certain time from capturing by the imaging device to generate compressed captured data;
a request acceptor that accepts a distribution request to specify a desired time from an information processing device;
a determiner that determines whether the desired time is a past time within the certain time from a present time; and
a distributor that distributes, when the desired time is the past time within the certain time from a present time, the captured data to the information processing device, and distributes, when the desired time is a past time prior to the certain time, the compressed captured data to the information processing device.

13. An image distribution method executed by an image distribution device, the image distribution method comprising:
receiving data captured by an imaging device of an in-vehicle device mounted in a vehicle;
compressing the captured data after an elapse of a certain time from capturing by the imaging device to generate compressed captured data;
accepting a distribution request to specify a desired time from an information processing device;
determining whether the desired time is a past time within the certain time from a present time; and
distributing, when the desired time is the past time within the certain time from a present time, the captured data to the information processing device, and distributing, when the desired time is a past time prior to the certain time, the compressed captured data to the information processing device.

* * * * *